(12) United States Patent
Hashiguchi et al.

(10) Patent No.: US 8,078,701 B2
(45) Date of Patent: Dec. 13, 2011

(54) NETWORK DESIGN AND DETERMINATION OF THE ARRANGEMENT OF OPTICAL TRANSMISSION DEVICES IN RESPECTIVE NETWORK STATIONS

(75) Inventors: Tomohiro Hashiguchi, Kawasaki (JP);
Toru Katagiri, Kawasaki (JP);
Kazuyuki Tajima, Kawasaki (JP);
Takashi Toyomaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 161 days.

(21) Appl. No.: 12/235,166

(22) Filed: Sep. 22, 2008

(65) Prior Publication Data
US 2009/0185805 A1 Jul. 23, 2009

(30) Foreign Application Priority Data
Jan. 23, 2008 (JP) ................. 2008-013055

(51) Int. Cl.
*G06F 15/177* (2006.01)
*G06F 15/173* (2006.01)
*H04B 10/08* (2006.01)
*G01R 31/08* (2006.01)

(52) U.S. Cl. ............ 709/220; 709/223; 398/9; 398/173; 370/229; 370/238

(58) Field of Classification Search .................. 709/220, 709/223; 398/9, 173; 370/229, 238
See application file for complete search history.

(56) References Cited

U.S. PATENT DOCUMENTS

| | | | | |
|---|---|---|---|---|
| 5,999,300 A | * | 12/1999 | Davies et al. | 398/185 |
| 6,366,728 B1 | * | 4/2002 | Way et al. | 385/123 |
| 2004/0151510 A1 | * | 8/2004 | Tanaka et al. | 398/147 |
| 2006/0023641 A1 | * | 2/2006 | Nakashima et al. | 370/254 |
| 2006/0067702 A1 | * | 3/2006 | Alicherry et al. | 398/160 |
| 2006/0098987 A1 | | 5/2006 | Hoshida | |

FOREIGN PATENT DOCUMENTS

| | | |
|---|---|---|
| JP | 2006-42279 | 2/2006 |
| JP | 2006-135788 | 5/2006 |

* cited by examiner

*Primary Examiner* — Ranodhi Serrao
(74) *Attorney, Agent, or Firm* — Staas & Halsey LLP

(57) ABSTRACT

A network design apparatus designs arrangement of various types of optical transmission devices in stations within a linear section in a network. An acquisition unit acquires information concerning the type of optical transmission device to be provided in the stations, and information concerning cost and transmission degradation for the optical transmission devices. The designing unit designs, based on the information acquired by the acquisition unit, an arrangement for which transmission degradation between stations respectively including an optical transmission device applicable as an optical regenerative repeater, is less than or equal to a threshold, and also has the least cost. An output unit outputs information concerning the arrangement designed by the design unit.

14 Claims, 14 Drawing Sheets

|  | 3R | 1R | LEVEL EQUALIZATION |
|---|---|---|---|
| 310 — OADM | ✓ | ✓ | ✓ |
| 320 — ILA |  | ✓ |  |
| 330 — BYPASS |  |  |  |

(FUNCTION / OPTICAL TRANSMISSION DEVICE) — 300

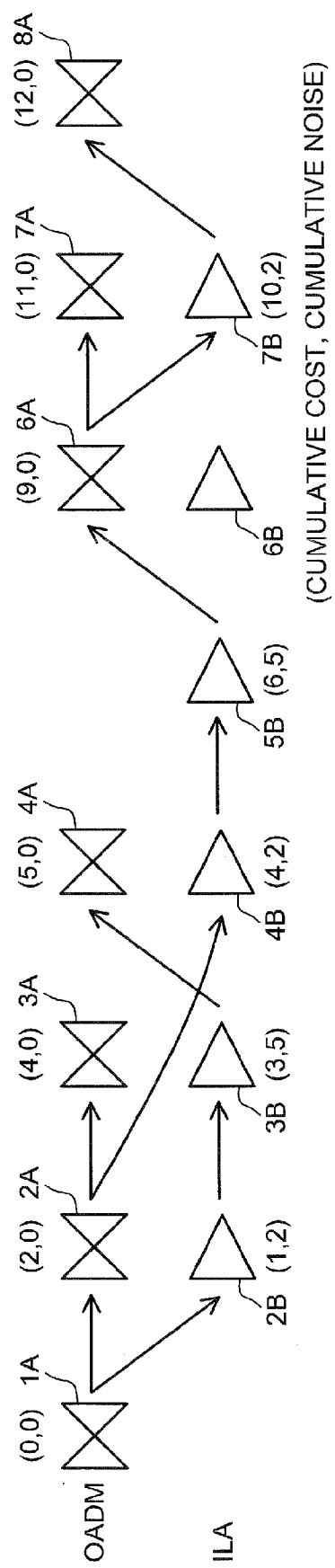

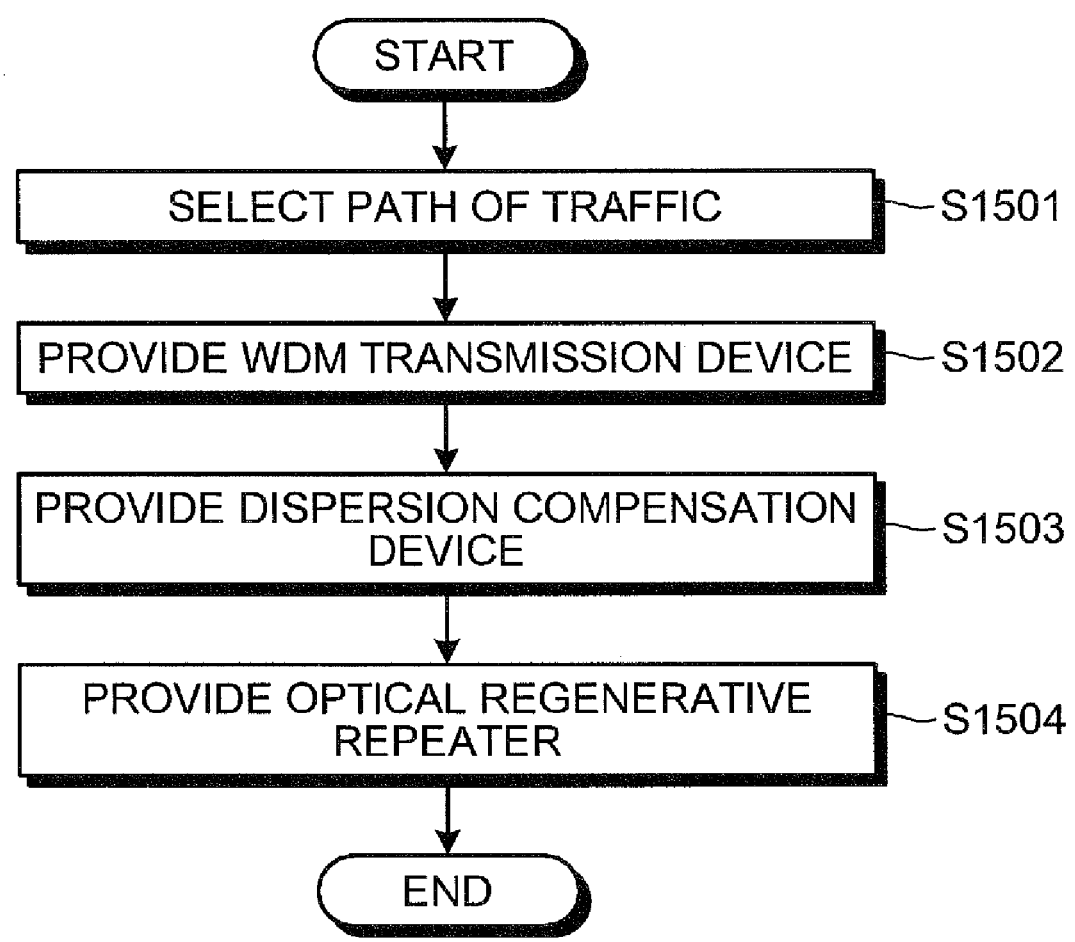

NETWORK DESIGN AND DETERMINATION OF THE ARRANGEMENT OF OPTICAL TRANSMISSION DEVICES IN RESPECTIVE NETWORK STATIONS

CROSS-REFERENCE TO RELATED APPLICATIONS

This application is based upon and claims the benefit of priority from the prior Japanese Patent Application No. 2008-013055, filed on Jan. 23, 2008, the entire contents of which are incorporated herein by reference.

BACKGROUND OF THE INVENTION

1. Field of the Invention

The present invention pertains to network design and determining arrangement of optical transmission devices in respective stations.

2. Description of the Related Art

In recent years, with use of optical add drop multiplexers (OADM) in optical networks, data in a channel is extracted from or added to a wavelength division multiplexed (WDM) optical signal.

OADMs are mainly used at the beginning or termination point of traffic but can be provided at a relay station to be used as repeaters that regenerate an arbitrary block of traffic. When a WDM network is designed, information concerning a station that can house a WDM transmission device, information concerning an optical mesh network built with optical fibers, and information concerning traffic are generally provided as input information (see Japanese Patent Application Laid-Open Publication Nos. 2006-135788 and 2006-42279).

A station at the beginning or termination point of traffic is equipped with an OADM. Other stations (relay stations) can be equipped with a WDM transmitting device such as an OADM functioning as a repeater or an in-line amplifier (ILA), and it is necessary to determine which device is to be provided. A rely station may be without a WDM transmitting device to simply connect optical fibers (bypass station).

In a mesh WDM network, especially at a linear section between each OADM station at the beginning or termination point of traffic or between optical hub stations having three or more connections, various configurations can be considered which have, for example, different device costs, optical signal noise ratios (OSNR), and optical path penalties (degradation), depending on the combination of WDM transmission devices provided in the relay stations in the linear section.

When a WDM network is designed, a WDM transmission device arrangement that minimizes cost and takes traffic distribution into consideration is preferable for each linear section. Conventionally, all possible combinations of device placement for each linear section are evaluated to compute a comprehensive cost including various parameters such as equipment cost or optical signal degradations so that a combination of device placements having the least cost is selected.

However, according to the conventional techniques, since all possible combinations of device placement in stations are evaluated to compute cost with various parameters, the number of combinations and computed costs becomes enormous as selectable devices or stations increase, whereby the processing time increases. Further, when design is conducted based only on comprehensive cost, although comprehensive cost may be reduced, optical signal degradation can exceed the range within which light can be regenerated by an optical regenerative repeater.

In traffic, each optical transmission parameter has a threshold and when the optical transmission parameters degrade below the threshold, light cannot be regenerated by the optical regenerative repeater. Therefore, in a section where optical transmission parameters degrade beyond the threshold, a device functioning as the optical regenerative repeater must be provided; otherwise transmission is not possible as the degradation of the optical signal exceeds the threshold.

SUMMARY OF THE INVENTION

It is an object of the present invention to at least solve the above problems in the conventional technologies.

A network design apparatus according to one aspect of the present invention is for designing an arrangement of optical transmission devices in stations in a linear section of a network. The network design apparatus includes an acquiring unit that acquires information concerning a type of optical transmission device applicable in the stations, respectively, and information concerning cost and transmission degradation associated with arrangement of the optical transmission devices; a designing unit that, based on the information acquired by the acquiring unit, designs an arrangement of the optical transmission devices wherein the cost is lowest, the cost being lowest among arrangements wherein between stations in which optical transmission devices applicable as optical regenerative repeaters are provided, the transmission degradation is less than or equal to a threshold; and an outputting unit that outputs information concerning the arrangement designed by the designing unit.

A network design method according to another aspect of the present invention is for designing an arrangement of optical transmission devices in stations in a linear section of a network. The network design method includes acquiring information concerning a type of optical transmission device applicable in the stations, respectively, and information concerning cost and transmission degradation associated with arrangement of the optical transmission devices; designing, based on the information acquired at the acquiring, an arrangement of the optical transmission devices wherein the cost is lowest, the cost being lowest among arrangements wherein, between stations in which optical transmission devices applicable as optical regenerative repeaters are provided, the transmission degradation is less than or equal to a threshold; and outputting information concerning the arrangement designed at the designing.

A computer-readable recording medium according to still another aspect of the present invention stores therein a network design program for designing an arrangement of optical transmission devices in stations in a linear section of a network, where the network design program causes a computer to execute acquiring information concerning a type of optical transmission device applicable in the stations, respectively, and information concerning cost and transmission degradation associated with arrangement of the optical transmission devices; designing, based on the information acquired at the acquiring, an arrangement of the optical transmission devices wherein the cost is lowest, the cost being lowest among arrangements wherein, between stations in which optical transmission devices applicable as optical regenerative repeaters are provided, the transmission degradation is less than or equal to a threshold; and outputting information concerning the arrangement designed by the designing unit.

The other objects, features, and advantages of the present invention are specifically set forth in or will become apparent

BRIEF DESCRIPTION OF THE DRAWINGS

FIG. 11 is a diagram of a result of the input link selection depicted in FIGS. 10A and 10B;

FIG. 15 is a flowchart of one example of network design depicted in FIG. 2.

DETAILED DESCRIPTION OF THE PREFERRED EMBODIMENTS

Referring to the accompanying drawings, exemplary embodiments according to the present invention are explained in detail below.

Figure 1:
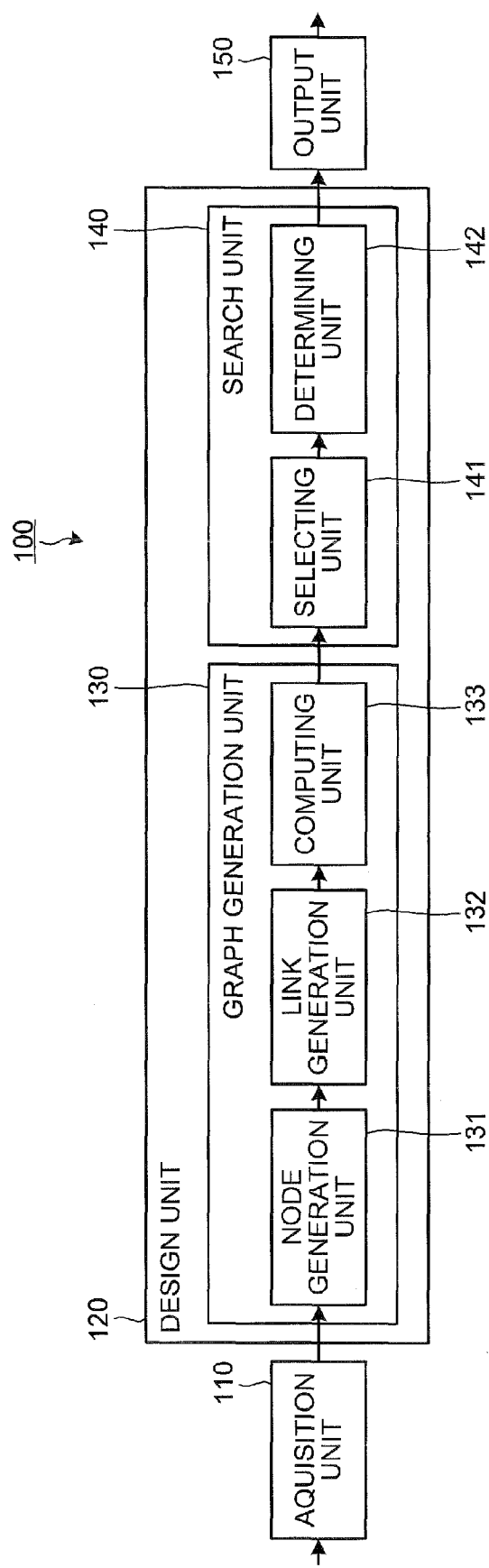
FIG. 1 is a functional diagram of a network design apparatus according to an embodiment.

FIG. 1 is a functional diagram of a network design apparatus. As depicted in FIG. 1, a network design apparatus 100 includes an acquisition unit 110, a design unit 120, and an output unit 150. The network design apparatus 100 designs an arrangement of various optical transmission devices for each station in a linear section of a network. The linear section of a design subject of the network design apparatus 100 is a linear section in a WDM system network.

The acquisition unit 110 acquires, from a source external to the network design apparatus 100, information concerning a network in a linear section of the design subject, information concerning the type of optical transmission device adoptable in each station, and information concerning cost and transmission degradation associated with optical transmission devices provided in stations. The information concerning the network includes, for example, information concerning stations in a linear section, information concerning connections between stations, and information concerning optical fibers equipped in stations with respect to optical transmission devices provided in the stations. The linear section indicates a configuration where a connection between stations is linear when expressed logically and is not dependent on physical arrangements of stations or on optical fiber laying.

Optical transmission devices that can be provided in stations include WDM transmission devices that transmit, receive, or relay WDM optical signals. The optical transmission devices include devices applicable as optical regenerative repeaters and devices that are not applicable as optical regenerative repeaters. The optical transmission devices applicable as repeaters include, for example, OADMs. The optical transmission devices that are not applicable as repeaters include, for example, ILAs that amplify WDM optical signals.

The design unit 120 designs, based on the information from the acquisition unit 110, an arrangement that minimizes cost among arrangements in which transmission degradation between stations provided with an optical transmission device applicable as an optical regenerative repeater is equal to or below a threshold. When the acquisition unit 110 acquires information concerning multiple types of transmission degradation, the design unit 120 designs an arrangement of optical transmission devices so that each transmission degradation is equal to or below a threshold.

The design unit 120 includes a graph generation unit 130 and a search unit 140. The graph generation unit 130 generates, based on the information from the acquisition unit 110, information concerning a directed graph without loops, nodes corresponding to the optical transmission devices, and links connecting the nodes.

The graph generation unit 130 includes a node generation unit 131, a link generation unit 132, and a computing unit 133. The node generation unit 131 generates, for each station and based on the information that is output from the acquisition unit 110 and concerns the types of the optical transmission devices, one or more nodes corresponding to optical transmission devices.

For example, here, a station 1 and a station 2 are within a linear section of the design subject. If the station 1 can be provided with an optical transmission device A or an optical transmission device B, the node generation unit 131 generates a node 1A corresponding to a case when the optical transmission device A is provided in the station 1 and a node 1B corresponding to a case when the optical transmission device B is provided in the station 1.

If the station 2 can be provided with only the optical transmission device A, the node generation unit 131 generates a node 2A corresponding to a case when the optical transmission device A is provided in the station 2. The node generation unit 131 outputs the nodes to the link generation unit 132. As explained, the node generation unit 131 generates one or more nodes with respect to stations within a linear section.

The link generation unit 132 generates, for each node output from the node generation unit 131, an input link from a node of a station upstream from a particular node (node of focus). For example, for the nodes 1A and 1B of the station 1 and the node 2A of the station 2 that is downstream from the station 1, the link generation unit 132 generates, with respect to the node 2A, an input link from the node 1A and an input link from the node 1B.

The link generation unit 132 outputs nodes output from the node generation unit 131 and input links to the computing unit 133. The computing unit 133 computes, based on the information concerning cost and transmission degradation output from the acquisition unit 110, cost and transmission degradation for an input link selected from among the input links output from the link generation unit 132.

The computing unit 133 computes, for example, cost and transmission degradation for a case when the input link from the node 1A to the node 2A is selected. The computing unit 133 further computes cost and transmission degradation for a case when the input link from the node 1B to the node 2A is selected.

The cost and the transmission degradation computed by the computing unit 133 are explained here. The cost is cost that is determined by the arrangement of optical transmission devices in stations. For example, the cost includes equipment cost of optical transmission devices provided in stations and transmission degradation of optical signals between stations provided with the optical transmission devices. The cost COST is, for example, given by equation (1) below.

$$COST = A \cdot c + B \cdot nf + C \cdot nb + \sum_{k=1}^{n} (Dk \cdot pfk + Ek \cdot pbk) \quad (1)$$

Symbols A to C, Dk, and Ek are constants that are different in each linear section. Symbol n is a value indicating a type of transmission penalty. The equipment cost c is computed based on the type of the optical transmission device corresponding to the terminal node of an input link. Symbols nf and nb express the amount of noise in the forward and inverse directions within the linear section. The amount of noise is computed, for example, based on information concerning the optical fiber corresponding to the input link and on the types of the optical transmission devices respectively corresponding to the starting node and the terminal node of the input link.

Symbols pfk and pbk are transmission penalties in the forward and inverse directions of the section. A transmission penalty is, for example, a degree of polarization mode dispersion (PMD). The degree of PMD is computed based on information concerning the optical fiber corresponding to an input link and on the types of the optical transmission devices corresponding to the starting node and the terminal node of the input link.

The amount of noise of and nb are noise components per unit optical signal power, which is computed, based on an OSNR [dB], as NOISE in equation (2).

$$NOISE = 10^{-\frac{OSNR}{10}}$$

When the OSNR is 30 dB, NOISE=$10^{(-30/10)}$=0.001. NOISE is a linear value unlike the OSNR, which is a logarithmic value, and is a parameter that simply can be added.

The transmission degradation is degradation of an optical signal transmitted between stations and is associated with optical transmission devices are provided in the stations. For example, the transmission degradation is noise occurring in optical signals transmitted between stations or a transmission penalty caused by optical transmission devices provided in the stations. Noise in optical signals is, for example, NOISE in equation (2) above. The acquisition unit 110 may acquire multiple kinds of information concerning transmission degradation such as information concerning noise and transmission penalty. The acquisition unit 110 outputs the acquired information to the design unit 120.

One example of cost computed by the computing unit 133 is explained. For example, the constants defined by a section are as follows: A (coefficient of equipment cost)=1, B (coefficient of noise in the forward direction)=2000, C (coefficient of noise in the inverse direction)=100, D (coefficient of PMD in the forward direction)=0.5, and E (coefficient of PMD in the inverse direction)=0.1.

Further, here, for the same input link, c=2, nf=nb=0.001, and pf=pb=2, where c is equipment cost of the optical transmission device corresponding to the terminal node of an input link, of is noise in the forward direction of optical signals between the optical transmission devices respectively corresponding to the starting node and the terminal node, nb is noise in the inverse direction, pf is PMD in the forward direction of optical signals between the optical transmission devices corresponding to the starting node and the terminal node, pb is PMD in the inverse direction.

In this case, the cost for the input link is computed as: 1·2+2000·0.001+100·0.001+0.5·2·2+0.1·2=5.3. The transmission degradation for the input link is as follows: noise in the forward direction and the inverse direction is 0.001, respectively, the PMD in the forward direction is 0.5, and the PMD in the inverse direction is 0.1. Coefficients A, B, C, D, and E are acquired by the acquisition unit 110 as network information.

Variables c, nf, nb, pf, and pb are acquired by the acquisition unit 110 as information concerning cost and transmission degradation. The computing unit 133 outputs nodes output from the node generation unit 131, input links output from the link generation unit 132, and the cost and the transmission degradation for each link as graphical information to the search unit 140.

The search unit 140 searches the graphical information output from the graph generation unit 130 for a path corresponding to an arrangement for which transmission degradation is equal to or below a threshold and that has the least cost. The search unit 140 includes a selecting unit 141 and a determining unit 142. The selecting unit 141 selects an input link for each node output from the graph generation unit 130.

The selecting unit 141 may select any of the input links generated by the link generation unit 132. In particular, the selecting unit 141 selects an input link that minimizes the cumulative cost up to the node of focus.

For example, here, input links to the node 2A include an input link (1A, 2A) from the node 1A and an input link (1B, 2A) from the node 1B. The cumulative costs up to the node 1A and 1B are COSTacc(1A) and COSTacc(1B), respectively. The cost for the input link (1A, 2A) is COST(1A, 2A) and the cost for the input link (1B, 2A) is COST(1B, 2A).

In this case, the node 2A being the node of focus, the selecting unit 141 compares the cumulative cost COSTacc (1A)+COST(1A, 2A) for the input link (1A, 2A) with the cumulative cost COSTacc(1B)+COST(1B, 2A) for the input link (1B, 2A). If the former is smaller, the selecting unit 141 selects the input link (1A, 2A) and if the latter is smaller, the selecting unit 141 selects the input link (1B, 2A).

The selecting unit 141, with respect to a node of focus, selects input links that yield the least cumulative cost, from among the input links for which cumulative transmission degradations up to a downstream optical regeneration node are equal to or below a threshold. The downstream optical regeneration node is a node corresponding to an optical transmission device provided in a station downstream from the station corresponding to the node of focus and applicable as an optical regeneration repeater.

For example, here, a station 3 is disposed downstream from the station 2 corresponding to the node 2A, and nodes 3A and 3B correspond to the station 3. The node 3A corresponds to an optical transmission device that is applicable as an optical regenerative repeater. In this case, the selecting unit 141 determines that the node 3A is a downstream optical regeneration node. The selecting unit 141 selects input links having the least cost, from among input links for which cumulative transmission degradation up to the node 3A is equal to or below a threshold.

When there are multiple downstream optical regeneration nodes, a node up to which the cumulative transmission degradation from the node 2A is the least, is determined and the selecting unit 141 selects input links having the least cost, from among the input links for which cumulative transmission degradation up to the determined node is equal to or below a threshold.

The selecting unit 141 uses the sum of (1) cumulative transmission degradation up to the starting node of an input link, (2) transmission degradation for the input link, and (3) the lowest transmission degradation from the node of focus to the downstream optical regeneration node, as the cumulative transmission degradation up to an optical regeneration node downstream from the node of focus.

For example, here, transmission degradation is noise in the forward direction; cumulative transmission degradation up to the node 1A and the node 1B is NOISEacc(1A) and NOISEacc(1B), respectively; noise over the input link (1A, 2A) and the input link (1B, 2A) computed by the computing unit 133 is NOISE(1A, 2A) and NOISE(1B, 2A), respectively; the lowest transmission degradation from the node 2A to the downstream optical regeneration node (node 3A) is NOISEmin; and the threshold for noise is NOISEth.

The selecting unit 141 computes NOISEacc(1A)+NOISE (1A, 2A)+NOISEmin for the input link(1A, 2A), and NOISEacc(1B)+NOISE(1B, 2A)+NOISEmin for the input link(1B, 2A), and compares each sum with NOISEth. The selecting unit 141 eliminates input links that yield a sum larger than NOISEth, and selects, from among the remaining input links, an input link that has the least cost.

When a node of focus corresponds to an optical input device applicable as an optical regenerative repeater, the selecting unit 141 determines NOISEmin=0. In this case, after an input link is selected, the selecting unit 141 determines the cumulative transmission degradation up to the node of focus to be 0 (zero).

For example, here, the node 2A corresponds to an optical transmission device applicable as an optical regenerative repeater. The selecting unit 141 computes, for the node 2A, NOISEacc(1A)+NOISE(1A, 2A)+0 and NOISEacc(1B)+NOISE(1B, 2A)+0. In addition, after an input link is selected, the selecting unit 141 determines the cumulative transmission degradation up to the node 2A (NOISEacc(2A)) to be 0 (zero). NOISEacc(2A) is used to select an input link of a node corresponding to the station 3 that is immediately downstream from the station 2.

The determining unit 142 determines an arrangement of optical transmission devices for stations within a linear section based on starting nodes of the input links output from the selecting unit 141. For example, when the starting nodes output from the selecting unit 141 are the node 1A, node 2B, node 3A, . . . , the determining unit 142 determines the optical transmission devices respectively corresponding to the nodes 1A, 2B, 3A, . . . , as the optical transmission devices to be provided in the stations, respectively.

The determining unit 142 outputs information concerning arrangement of the optical transmission devices to the output unit 150. The output unit 150 outputs the information output from the design unit 120 to a destination external to the network design apparatus 100. According to the configuration explained above, an arrangement of optical transmission devices for stations within a linear section of a network is designed.

Figure 2:
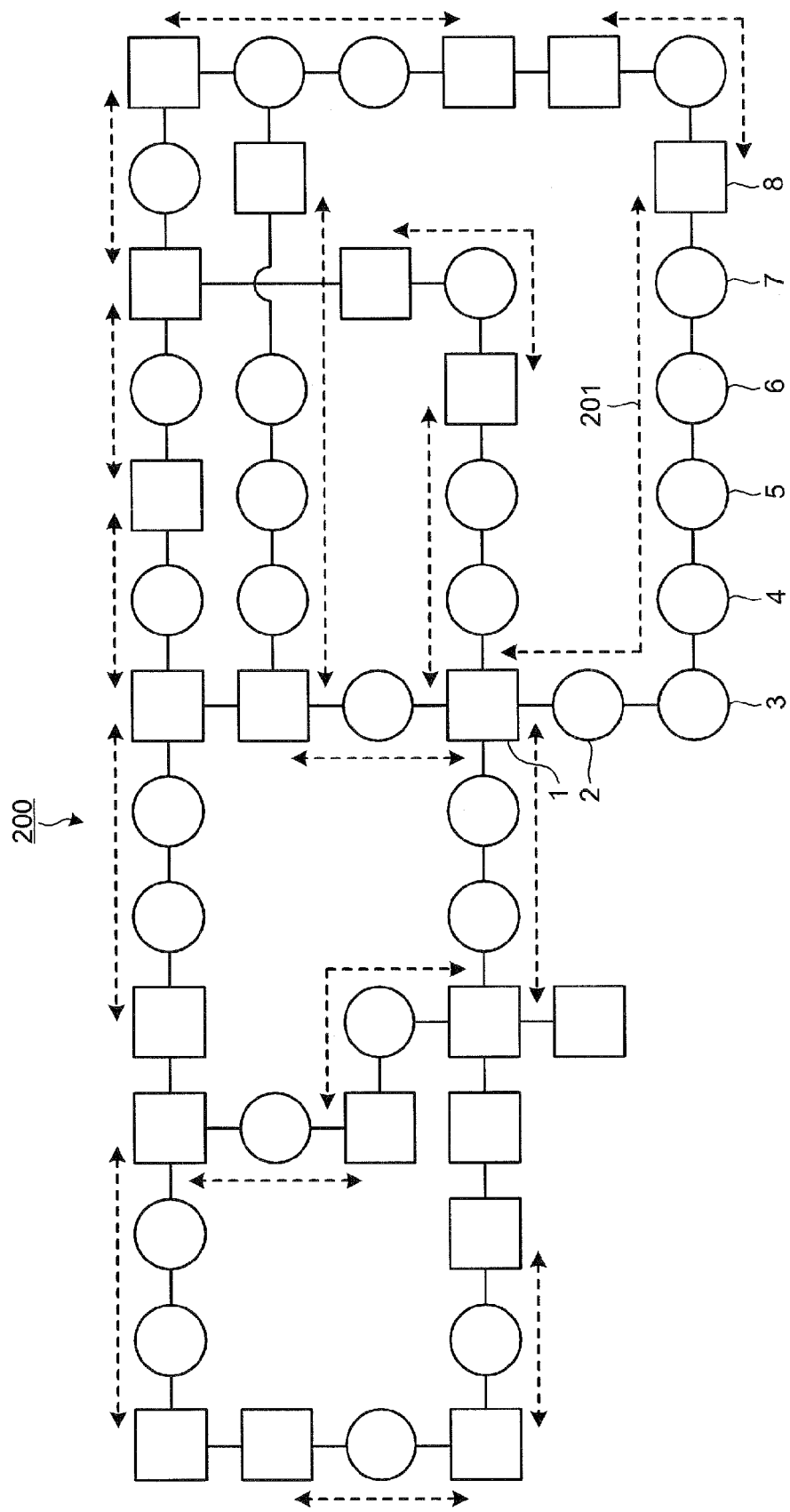
FIG. 2 is a diagram of linear sections in a network under design.

FIG. 2 is a diagram of linear sections in a network under design. As depicted in FIG. 2, a network 200 is a mesh network that is part of a WDM system. A square figure in the diagram indicates a station where an optical add/drop device is provided. A circular figure in the diagram indicates a station that relays a WDM optical signal between the stations indicated by a square figure. A two-headed arrow formed with a dotted line indicates a linear section in the network 200. The network design apparatus 100 designs an arrangement of optical transmission devices for each linear section indicated by the two-headed dotted arrow.

As indicated by the dotted arrows, a linear section of the design subject of the network design apparatus 100 is a section in which 3 or more stations are linearly connected. Hereinafter, a linear section 201 is taken as an example. The section 201 includes linearly connected stations 1 to 8. The station 1 being a starting station and the station 8 being a terminal station, each have an optical transmission device applicable as an optical regenerative repeater.

Figures 3, 4:
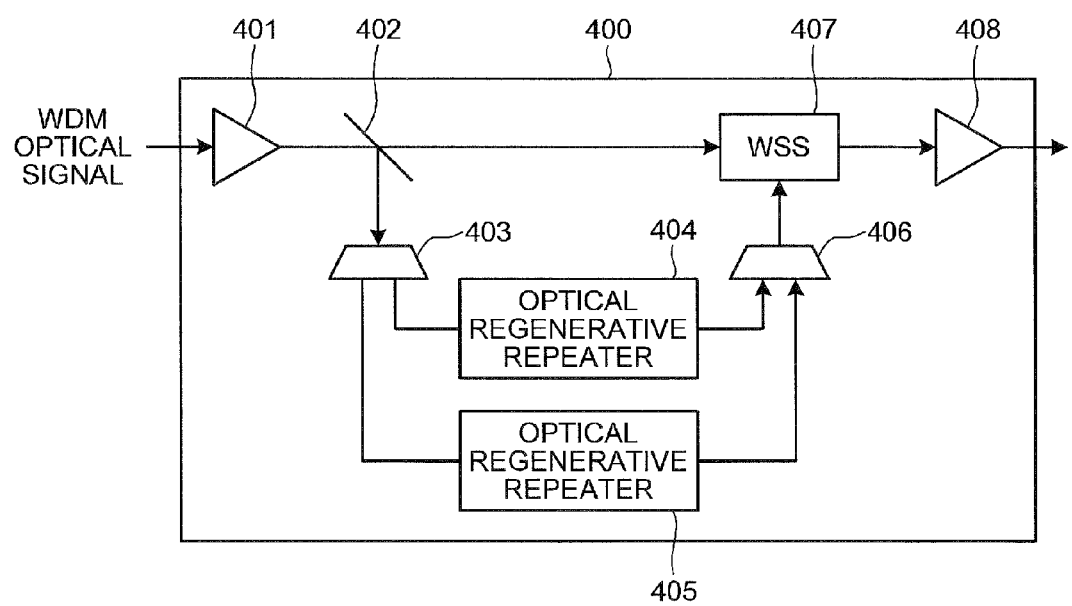
FIG. 3 is a diagram of one example of optical transmission devices provided in each station.
FIG. 4 is a block diagram of one example of an OADM used as a repeater depicted in FIG. 3.

FIG. 3 is a diagram of one example of optical transmission devices provided in each station. As depicted in FIG. 3 by a table 300, the types of optical transmission device provided in stations include, for example, an OADM 310, an ILA 320, a bypass 330. The OADM 310 is an optical transmission device applicable as an optical regenerative repeater. The OADM 310 can perform reamplification, reshaping, and retiming (3R) for wavelength channels applied optical regenerative repeaters, and reamplification (1R) for wavelength channels without optical regenerative repeaters.

The ILA 320 and the bypass 330 are optical transmission devices that are not applicable as an optical regenerative repeater. The ILA 320 can only perform reamplification (1R), i.e., amplify optical signals. The bypass 300 only lets optical signals through. Generally, equipment cost included in cost is the highest for the OADM 310 and the lowest for the bypass 330.

On the other hand, transmission degradation is the highest for the bypass 330 and the lowest for the OADM 310. Therefore, generally, there is a trade-off between equipment cost and transmission degradation. The network 100 selects any one from among the OADM 310, the ILA 320, and the bypass 330 for each station such that a condition for transmission degradation is fulfilled and the cost is minimized.

FIG. 4 is a block diagram of one example of an OADM used as a repeater depicted in FIG. 3. As depicted in FIG. 4, an OADM 400 includes an amplifier 401, a branching unit 402, a de-multiplexer 403, optical regenerative repeaters 404 and 405, a multiplexer 406, a wavelength selective switch (WSS) 407, and an amplifier 408. The amplifier 401 amplifies a WDM optical signal input from a source external to the OADM 400 and outputs the amplified signal to the branching unit 402. The optical regenerative repeater 404 is applied to an arbitrary wavelength channel as needed.

The branching unit 402 divides the WDM optical signal output from the amplifier 401, and outputs the divided WDM optical signal to the de-multiplexer 403 and the WSS 407, respectively. The de-multiplexer 403 performs wavelength de-multiplexing on the WDM signal output from the branching unit 402 and outputs resultant optical signals to the optical regenerative repeaters 404 and 405.

The optical regenerative repeaters 404 and 405 regenerate the optical signals output from the de-multiplexer 403 and output the regenerated optical signals to the multiplexer 406. The multiplexer 406 performs wavelength multiplexing on the optical signals output from the optical regenerative repeaters 404 and 405, and outputs the WDM optical signal to the WSS 407.

The WSS 407 selectively multiplexes optical signals from the branching unit 402 and the multiplexer 406, and outputs the WDM optical signal to the amplifier 408. The WSS 407 further equalizes the level of the WDM optical signal output to the amplifier 408. The amplifier 408 amplifies the WDM optical signal from the WSS 407 and outputs the amplified signal to a destination external to the OADM 400.

Figure 5:
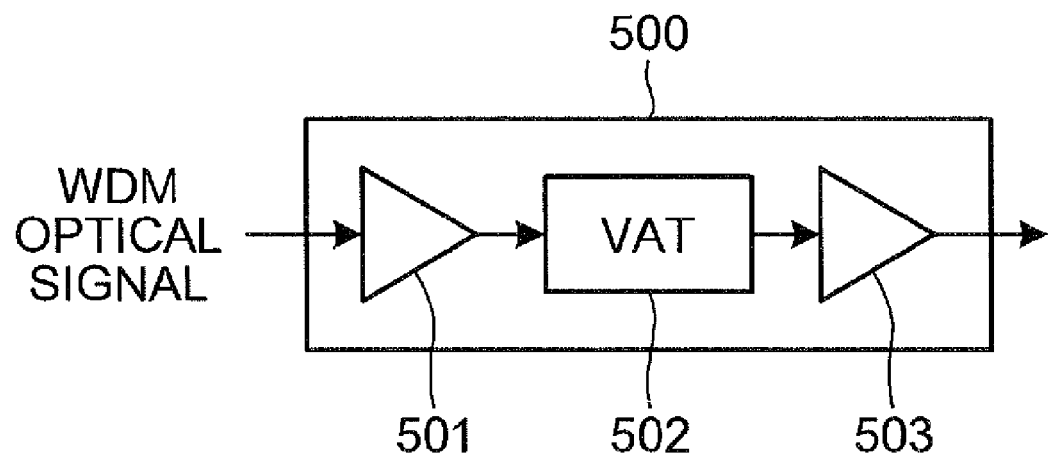
FIG. 5 is a block diagram of one example of an ILA depicted in FIG. 3.

FIG. 5 is a block diagram of one example of an ILA depicted in FIG. 3. As depicted in FIG. 5, an ILA 500 includes an amplifier 501, a variable attenuator (VAT) 502, and an amplifier 503. The ILA 500 collectively amplifies optical signals included in a WDM optical signal input thereto. A WDM optical signal is input to the amplifier 501 from an external source. The amplifier 501 amplifies the WDM optical signal and outputs the signal to the VAT 502.

The VAT 502 attenuates the WDM optical signal output from the amplifier 501 by a variable magnitude and controls the power of the WDM optical signal output from the amplifier 501. The VAT 502 outputs the WDM optical signal to the amplifier 503. The amplifier 503 amplifies the WDM optical signal output from the VAT 502 and outputs the WDM optical signal to a destination external to the ILA 500.

Figure 6:
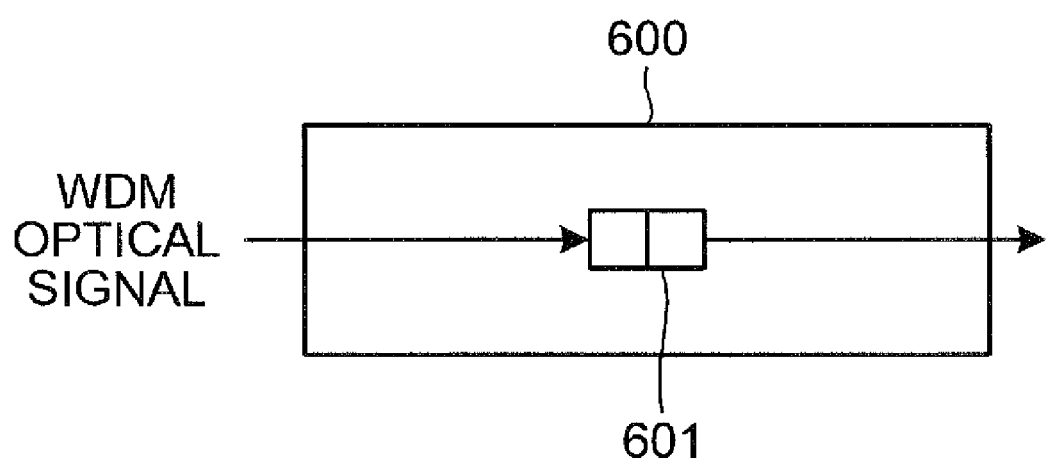
FIG. 6 is a block diagram of one example of a bypass depicted in FIG. 3.

FIG. 6 is a block diagram of one example of the bypass depicted in FIG. 3. As depicted in FIG. 6, a bypass 600 receives a WDM optical signal from an external source. The bypass 600 includes a connector 601 that connects an output end of an optical fiber, into which the WDM optical signal is input, with an input end of an output optical fiber. The WDM optical signal input to the bypass 600 is output to a destination external to the bypass 600 through the connector 601. FIGS. 4 to 6 depict only a block diagram for the transmission of the WDM optical signal from left to right with respect to the figures; however, a typical WDM device further includes blocks for signals to be transmitted from right to left with respect to the figures.

Figure 7:
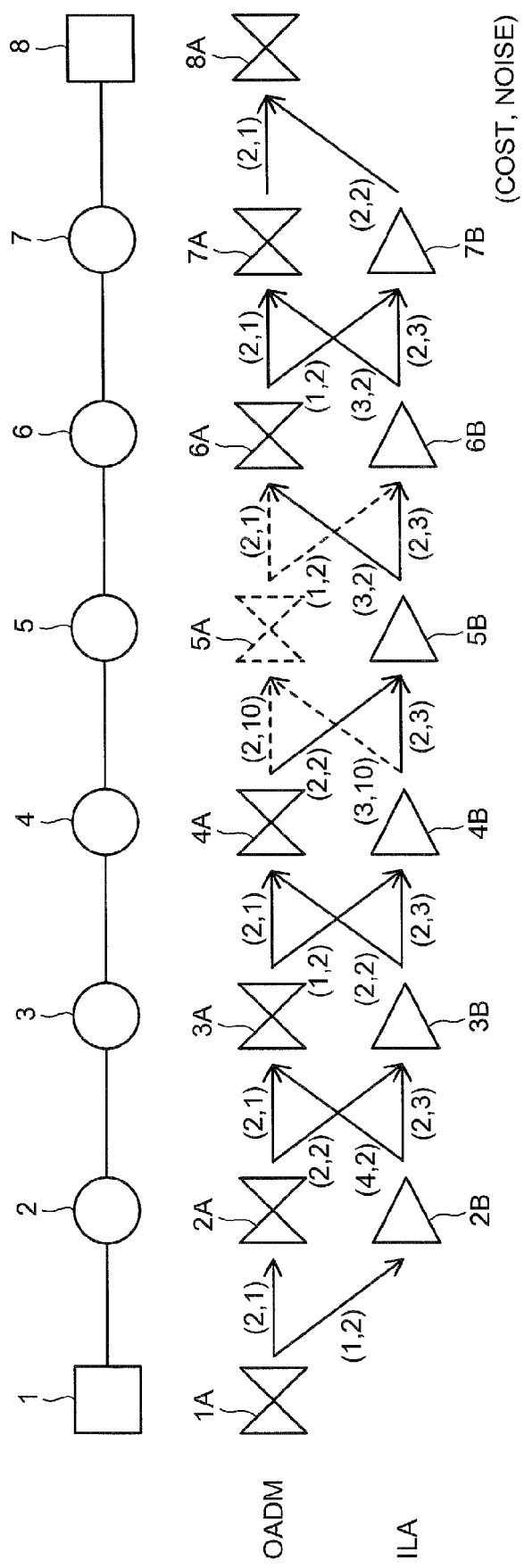
FIG. 7 is a diagram of one example of graphical information generated by a graph generation unit.

FIG. 7 is a diagram of one example of graphical information generated by the graph generation unit. Stations 1 to 8 in FIG. 7 are equivalent to the stations 1 to 8 within the linear section 201 depicted in FIG. 2. Nodes 1A to 8A and nodes 2B to 7B are nodes generated by the node generation unit 131. Here, a case when only the noise in the forward direction is used as transmission degradation is explained; NOISEth(=7); an OADM (for example, the OADM 400 in FIG. 4) is used as an optical transmission device that can regenerate signals.

Further, an ILA (for example, the ILA 500 in FIG. 5) is used as an optical transmission device that cannot regenerate signals. The station 1 at the starting end and the station 8 at the terminal end can include only an OADM applicable as an optical regenerative repeater. The stations 2 to 7 can include an OADM, an ILA, or a bypass (for example, the bypass 600 in FIG. 6).

The node generation unit 131 generates, for the stations 1 to 8, the nodes 1A to 8A indicating OADMs. The node generation unit 131 further generates, for the stations 2 to 7, the nodes 2B to 7B indicating ILAs. In FIG. 7, arrows indicate input links between the nodes 1A to 8A and 2B to 7B generated by the link generation unit 132. In the explanation below, an input link from a node X to a node Y is expressed as input link (X, Y).

The link generation unit 132 does not generate an input link to the node 1A because the node 1A is a node corresponding to the starting station. The link generation unit 132 generates, for the node 2A, an input link (1A, 2A) from the node 1A, which corresponds to the station 1 upstream from the station 2 corresponding to the node 2A. The link generation unit 132 further generates, for the node 2B, an input link (1A, 2B) from the node 1A.

The link generation unit 132 further generates, for the node 3A, an input link (2A, 3A) from the node 2A and an input link (2B, 3A) from the node 2B. The link generation unit 132 further generates, for the node 3B, an input link (2A, 3B) from the node 2A and an input link (2B, 3B) from the node 2B.

The link generation unit 132 further generates, for the node 4A, an input link (3A, 4A) from the node 3A and an input link (3B, 4A) from the node 3B. The link generation unit 132 further generates, for the node 4B, an input link (3A, 4B) from the node 3A and an input link (3B, 4B) from the node 3B.

The link generation unit 132 further generates, for the node 5A, an input link (4A, 5A) from the node 4A and an input link (4B, 5A) from the node 4B. The link generation unit 132 further generates, for the node 5B, an input link (4A, 5B) from the node 4A and an input link (4B, 5B) from the node 4B.

The link generation unit 132 further generates, for the node 6A, an input link (5B, 6A) from the node 5B. The link generation unit 132 further generates, for the node 6B, an input link (5B, 6B) from the node 5B.

The link generation unit 132 further generates, for the node 7A, an input link (6A, 7A) from the node 6A and an input link (6B, 7A) from the node 6B. The link generation unit 132 further generates, for the node 7B, an input link (6A, 7B) from the node 6A and an input link (6B, 7B) from the node 6B.

The link generation unit 132 further generates, for the node 8A, an input link (7A, 8A) from the node 7A and an input link (7B, 8A) from the node 7B. One example of cost and noise computed by the computing unit 133 is shown below; however, the computing method of the cost and noise is as explained above.

As depicted in FIG. 7, for each input link, the cost and noise computed by the computing unit 133 are indicated as (cost, noise). The computing unit 133 outputs (2, 1) as the cost and noise for the input link (1A, 2A). The computing unit 133 outputs (1, 2) as the cost and noise for the input link (1A, 2B).

The computing unit 133 outputs (2, 1) for the input link (2A, 3A); (4, 2) for the input link (2B, 3A); (2, 2) for the input link (2A, 3B); and (2, 3) for the input link (2B, 3B).

The computing unit 133 outputs (2, 1) for the input link (3A, 4A); (2, 2) for the input link (3B, 4A); (1, 2) for the input link (3A, 4B); and (2, 3) for the input link (3B, 4B).

The computing unit 133 outputs (2, 10) for the input link (4A, 5A); and (3, 10) for the input link (4B, 5A). Since the noise for the input links (4A, 5A) and (4B, 5A) exceeds NOISEth(=7), the computing unit 133 deletes the input links (4A, 5A), (4B, 5A), (5A, 6A), and (5A, 6B).

The computing unit 133 outputs (2, 2) for the input link (4A, 5B); (2, 3) for the input link (4B, 5B); (3, 2) for the input link (5B, 6A); and (2, 3) for the input link (5B, 6B).

The computing unit 133 outputs (2, 1) for the input link (6A, 7A); (3, 2) for the input link (6B, 7A); (1, 2) for the input link (6A, 7B); and (2, 3) for the input link (6B, 7B).

The computing unit 133 outputs (2, 1) for the input link (7A, 8A); and (2, 2) for the input link (7B, 8A). In this way, the graphical information is generated, the graphical information, nodes that correspond to OADMs and ILAs to be provided in the stations 1 to 8, and links that connect nodes and to which transmission degradation and noise are correlated.

Figure 8:
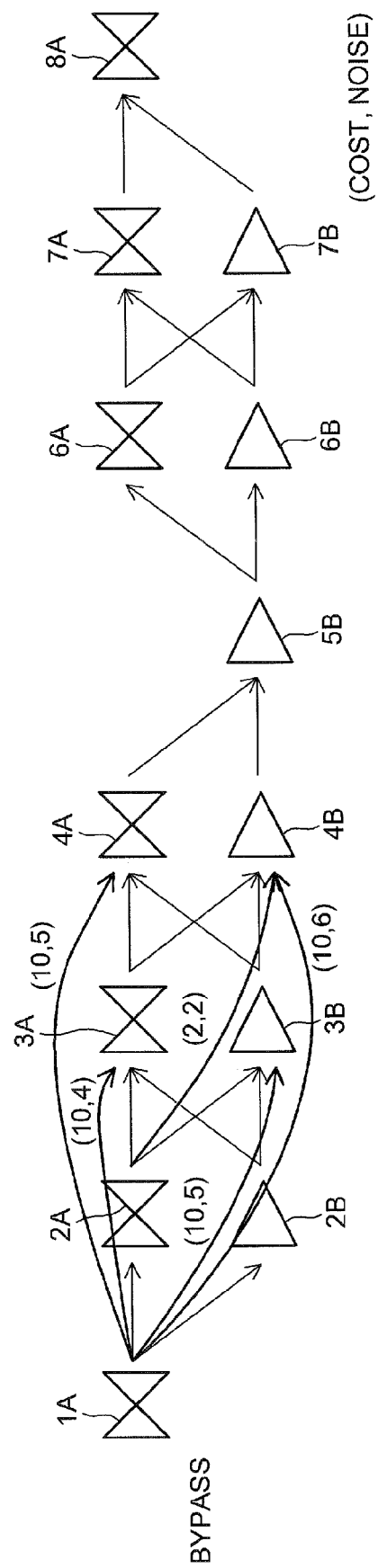
FIG. 8 is a diagram of another example of graphical information generated by the graph generation unit.

FIG. 8 is a diagram of another example of graphical information generated by the graph generation unit. In FIG. 8, the cost and noise computed by the computing unit 133 and indicated in FIG. 7 are omitted. FIG. 7 explains a case where the link generation unit 132 generates input links only from nodes immediately upstream from the node of focus. However, in addition to such input links, the link generation unit 132 may generate input links from nodes which are two or more links away from the node of focus.

The link generation unit 132 generates, for the node 3A, an input link (1A, 3A) from the node 1A in addition to the input links (2A, 3A) and (2B, 3A). If the input link (1A, 3A) is selected for the node 3A, a bypass is provided in the station 2.

The link generation unit 132 generates, for the node 3B, an input link (1A, 3B) from the node 1A in addition to the input links (2A, 3B) and (2B, 3B). If the input link (1A, 3B) is selected for the node 3B, a bypass is provided in the station 2.

The link generation unit 132 generates, for the node 4A, an input link (1A, 4A) from the node 1A in addition to the input links (3A, 4A) and (3B, 4A). If the input link (1A, 4A) is selected for the node 4A, a bypass is provided in the stations 2 and 3.

The link generation unit 132 generates, for the node 4B, an input link (1A, 4B) from the node 1A and an input link (2A, 4B) from the node 2A corresponding to the station 2 upstream from the station 4, in addition to the input links (3A, 4B) and (3B, 4B).

If the input link (1A, 4B) is selected for the node 4B, bypasses are provided in the stations 2 and 3. If the input link (2A, 4B) is selected, a bypass is provided in the station 3. In this way, the input links (1A, 3A), (1A, 3B), (1A, 4A), (1A, 4B) and (2A, 4B) are generated as bypass links.

The computing unit 133 outputs cost and noise as (10, 4) for the input link (1A, 3A); (10, 5) for the input link (1A, 3B); and (10, 5) for the input link (1A, 4A).

The computing unit 133 outputs cost and noise as (10, 6) for the input link (1A, 4B); and (2, 2) for the input link (2A, 4B). More bypass links can be generated; however, in the explanation below, only the input links depicted in FIG. 7 and these bypass links are used for brevity. As a result of graph generation, no input link for the node 5A exists and the computing unit 133 deletes the node 5A.

Figure 9:
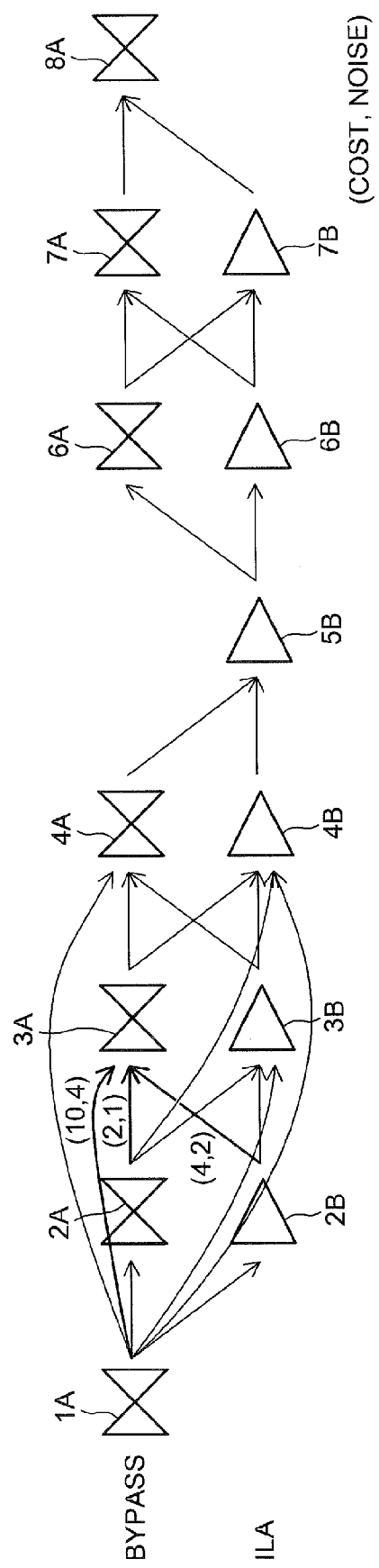
FIG. 9 is a diagram of input link selection by a selection unit.

FIG. 9 is a diagram of input link selection by the selection unit. In FIG. 9, identical parts to those depicted in FIGS. 7 and 8 are given identical reference signs, respectively, and the explanation thereof is omitted. Here, the selection of an input link to the node 3A is explained. Input links to the node 3A are expressed by bold arrows and other input links are expressed by thin arrows. The selecting unit 141 selects one input link from among the three input links (2A, 3A), (2B, 3A), and (1A, 3A) to the node 3A.

If one input link is selected from among the three links to the node 3A and the station 3 includes an OADM, the determining unit 142 determines arrangement up to the station immediately upstream from the station 3 in which an OADM or ILA is provided. If the selecting unit 141 selects the input link (2A, 3A) and the station 3 includes an OADM, the determining unit 142 determines that the station 2 includes an OADM.

If the selecting unit 141 selects the input link (2B, 3A) and the station 3 includes an OADM, the determining unit 142 determines that the station 2 includes an ILA. If the selecting unit 141 selects the input link (1A, 3A) and the station 3 includes an OADM, the determining unit 142 determines that the station 2 includes a bypass and the station 1 includes an OADM.

Here, description of a case where the selecting unit 141 selects one input link from among the input links to the node 3A; however, the selecting unit 141 further selects one input link from among input links to the other nodes 2A to 4A, 6A to 8A, and 2B to 7B in a similar manner. As a result, a path corresponding to an arrangement is found where the transmission degradation is equal to or below a threshold and the cost is the least.

Figure 10A:
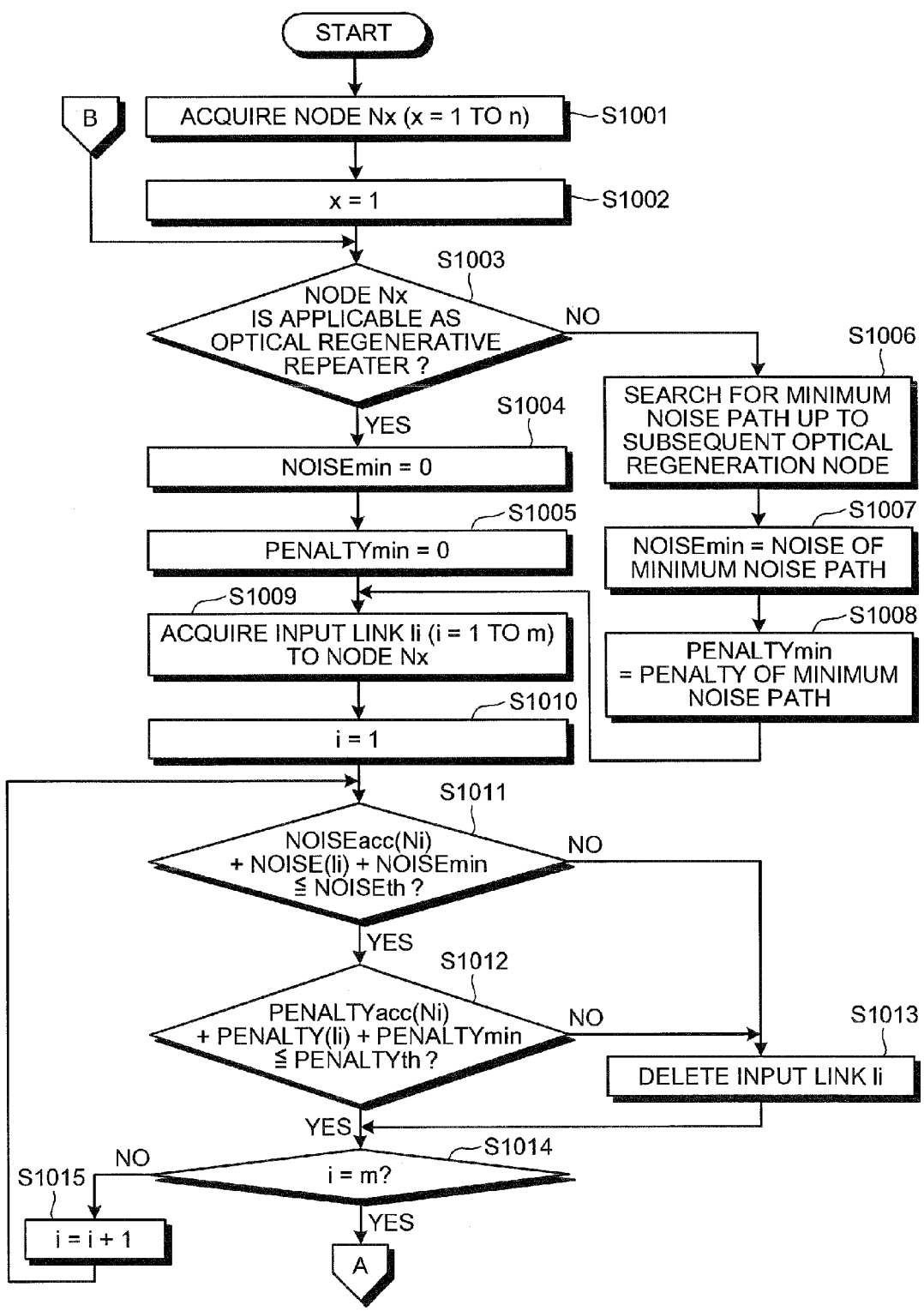
FIG. 10A is a flowchart of one example of the input link selection by the selection unit.
Figure 10B:
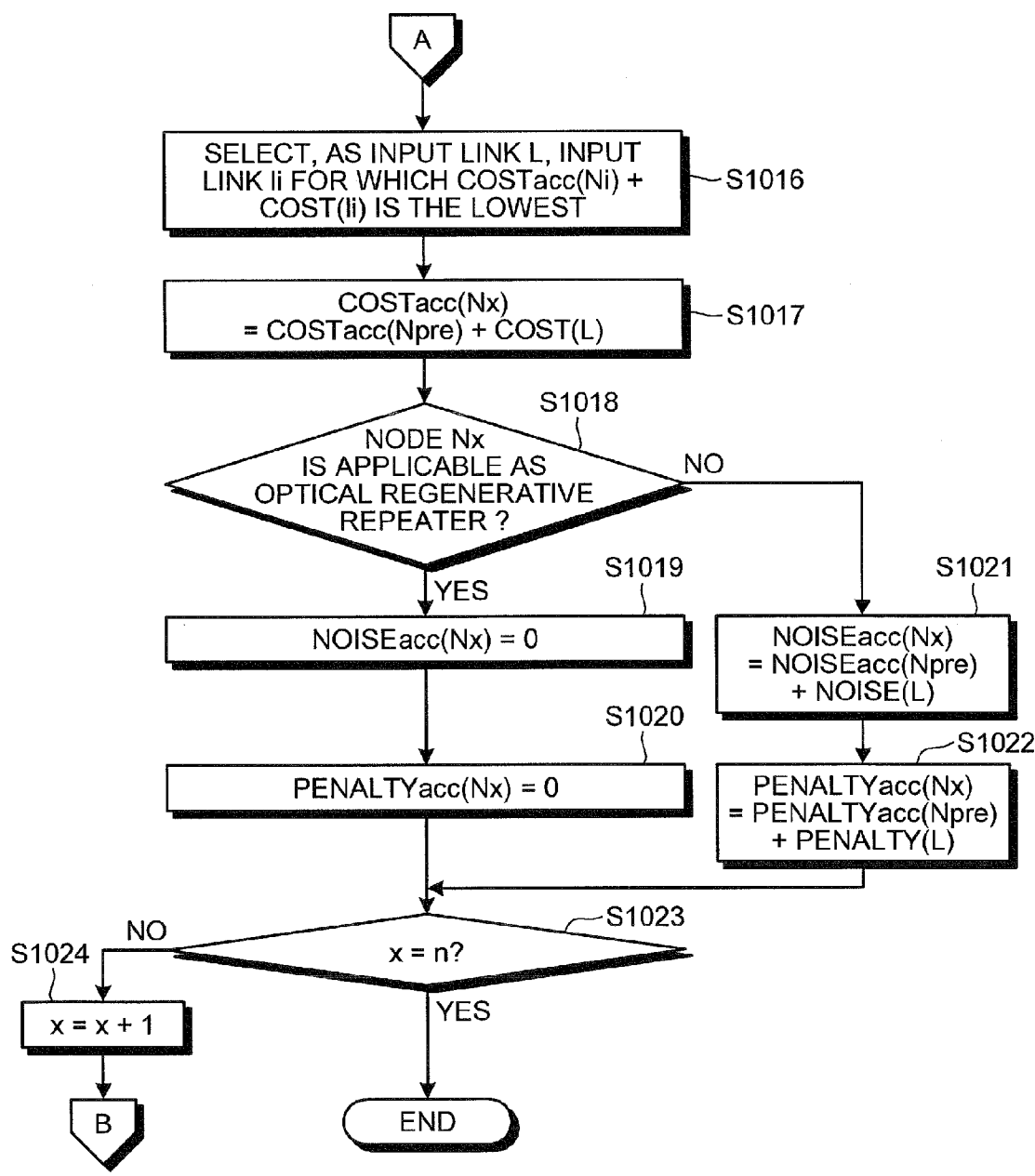
FIG. 10B is another flowchart of the example of the input link selection by the selection unit.

FIG. 10A is a flowchart of one example of the input link selection by the selection unit. FIG. 10B is another flowchart of the example of the input link selection by the selection unit. In the description concerning FIGS. 10A and 10B, a noise in the forward direction or a component of a transition penalty (for example, PMD) in the forward direction is used as transmission degradation.

Nodes Nx (x=1 to n) generated by the node generation unit 131 are acquired (step S1001). A node number x is set to 1 (step S1002). It is determined whether the node Nx is a node applicable as an optical regenerative repeater (step S1003).

If the node Nx is applicable as an optical regenerative repeater (step S1003: YES), the minimum value of noise NOISEmin is set to 0 (zero) (step S1004). The NOISEmin is the lowest value of noise from the node Nx to the downstream optical regeneration node in the forward direction. The minimum value of transmission penalty PENALTYmin is set to 0 (zero) (step S1005) and the flow proceeds to step S1009.

If the node Nx is not applicable as an optical regenerative repeater (step S1003: NO), a minimum noise path up to a downstream optical regeneration node subsequent to the node Nx is searched for (step S1006). The minimum noise path up to a downstream optical regeneration node next to the node Nx denotes a path up to one of the downstream optical regeneration nodes yielding the lowest sum of noise over input links up to the node Nx.

The NOISEmin is set to the noise of the minimum noise path found at step S1006 (step S1007). The PENALTYmin is set to the transmission penalty of the minimum noise path (step S1008). Input links li (i=1 to m) to the node Nx are acquired (step S1009). The PENALTYmin is used as a value over the minimum noise path here; however, a path where a transmission penalty is the least may be searched for separately and the PENALTYmin may be set to the value over such a path.

An input link number i of the input link li is set to 1 (step S1010). It is determined whether the sum of (1) the cumulative noise NOISEacc(Ni) up to the starting node Ni of the input link li, (2) noise NOISE(li) when the input link li is selected, and (3) the NOISEmin set at step S1004 or S1007, is at most NOISEth (step S1011).

If the sum at step S1011 is not more than NOISEth (step S1011: YES), it is determined whether the sum of (1) the cumulative transmission penalty PENALTYacc(Ni) up to the starting node Ni of the input link li, (2) transmission penalty PENALTY(li) for the input link li, and (3) the minimum value of transmission penalty PENALTYmin set at step S1005 or S1008, is at most a threshold for transmission penalty PENALTYth (step S1012).

If the sum at step S1011 is more than NOISEth (step S1011: NO), or if the sum at step S1012 is more than PENALTYth (step S1012: NO), the input link li is deleted from among the input links acquired at step S1009 (step S1013), and the flow proceeds to step S1014.

If the sum at step S1012 is not more than PENALTYth (step S1012: YES), it is determined whether the input link number i is equivalent to the last number m (step S1014). If i is not equivalent to m (step S1014: NO), the input link number i is changed to i+1 (step S1015), and the flow returns to step S1011.

If i is equivalent to m (step S1014: YES), the flow proceeds to step S1016 in FIG. 10B (sign A). From among the input links that were acquired at step S1009 and still remain after the deletion at step S1013, an input link that yields the lowest sum of the cumulative cost COSTacc(Ni) up to the starting node Ni and the cost of input link li (li) is selected as an input link L to the node Nx (step S1016).

The cumulative cost COSTacc(Nx) up to the node Nx is computed as follows: COSTacc(Nx)=COSTacc(Npre)+

COST(L) (step S1017). The COSTacc(Npre) at step S1017 is the cumulative cost up to a starting node Npre of the input link L selected at step S1016. The COST(L) is the cost when the input link L is selected.

It is determined whether the node Nx is applicable as an optical regenerative repeater (step S1018). If the node Nx is applicable as an optical regenerative repeater (step S1018: YES), the cumulative noise NOISEacc(Nx) up to the node Nx is set to 0 (zero) (step S1019). The cumulative transmission penalty PENALTYacc(Nx) up to the node Nx is set to 0 (zero) (step S1020), and the flow proceeds to step S1023.

If the node Nx is not applicable as an optical regenerative repeater (step S1018: NO), NOISEacc(Nx) is set to equal the sum of the cumulative noise NOISEacc(Npre) up to Nx and the noise NOISE(L) of the input link L(step S1021).

PENALTYacc(Nx) is set to equal PEANLTYacc(Npre)+PENALTY(L) (step S1022). The PENALTYacc(Npre) is the cumulative penalty up to the node Npre. The PENALTY(L) is a transmission penalty of the input link L. It is determined whether the node number x is equivalent to the last number n (step S1023).

If x is not equivalent to n (step S1023: NO), x is changed to x+1 (step S1024), and the flow returns to step S1003 in FIG. 10A (sign B). If x is equivalent to n (step S1023: YES), the selection of the input link is terminated.

According to the steps above, an input link L is selected for each node Nx generated by the node generation unit 131. Hereinafter, a case where the steps depicted in FIGS. 10A and 10B are applied to the examples depicted in FIGS. 7 to 9 is explained. In the explanation, only noise in the forward direction is used as transmission degradation, thereby skipping steps S1005, S1008, S1020, and S1022 in FIGS. 10A and 10B.

FIG. 11 is a diagram of a result of the input link selection depicted in FIGS. 10A and 10B. In FIG. 11, identical parts to those depicted in FIGS. 7 to 9 are given identical reference signs, respectively, and the explanation thereof is omitted. In FIG. 11, arrows denote input links L selected at the steps depicted in FIGS. 10A and 10B. For each node, COSTacc and NOISEacc computed at steps S1019 to S1022 are appended and expressed as (cumulative cost, cumulative noise).

Determination of an input link L to the node 2A is explained. Since the node 2A is a node corresponding to an OADM (step S1003: YES), NOISEmin is equal to 0 (zero) (step S1004). Only the input link (1A, 2A) is acquired as the input link to the node 2A (step S1009).

The sum of noise for the input link (1A, 2A) is computed as follows (step S1011): NOISEacc(N1A)+NOISE(1A, 2A)+NOISEmin=0+1+0=1. Since the sum is not more than NOISEth(=7) (step S1011: YES), the input link (1A, 2A) is not deleted (step S1013).

The sum of the cost for the input link (1A, 2A) is computed as follows (step S1016): COSTacc(N1A)+COST(1A, 2A)=0+2=2. The remaining input link is only the input link (1A, 2A). Therefore, the input link (1A, 2A) is selected as an input link L to the node 2A (step S1016).

The cumulative cost COSTacc(N2A) up to the node 2A is computed as follows (step S1017): COSTacc(N1A)+COST(1A, 2A)=0+2=2. Since the node 2A is a node corresponding to an OADM (step S1018: YES), the cumulative noise NOISEacc(N2A) up to the node 2A is equal to 0 (zero) (step S1019).

Determination of an input link L to the node 2B is explained. Since the node 2B is a node corresponding to an ILA (step S1003: NO), a path from the node 2B to 3A is searched for as a minimum noise path up to a downstream optical regeneration node of the node 2B (step S1006). As a result, NOISEmin is equal to 2 (step S1007). Only the input link (1A, 2B) is acquired as input links to the node 2B (step S1009).

The sum of noise for the input link (1A, 2B) is computed as follows (step S1011): NOISEacc(N1A)+NOISE(1A, 2B)+NOISEmin=0+2+2=4. Since the sum of noise when the input link (1A, 2B) is selected is not more than NOISEth(=7) (step S1011: YES), the input link (1A, 2B) is not deleted (step S1013).

The sum of cost for the input link (1A, 2B) is computed as follows (step S1016): COSTacc(N1A)+COST(1A, 2B)=0+1=1. In this case, the remaining input link is only the input link (1A, 2B) and thus the input link (1A, 2B) is selected as an input link L to the node 2B (step S1016).

The cumulative cost COSTacc(N2B) up to the node 2B is computed as follows (step S1017): COSTacc(N1A)+COST(1A, 2B)=0+1=1. Since the node 2B is a node corresponding to an ILA (step S1018: NO), cumulative noise NOISEacc(N2B) is computed as follows (step S1021): NOISEacc(N1A)+NOISE(1A, 2B)=0+2=2.

Determination of an input link L to the node 3A is explained. Since the node 3A is a node corresponding to an OADM (step S1003: YES), the minimum value of noise NOISEmin becomes 0 (zero) (step S1004). As input links to the node 3A, the input link (2A, 3A), the input link (2B, 3A), and the input link (1A, 3A) are acquired (step S1009).

The sum of noise for the input link (2A, 3A) is computed as follows (step S1011): NOISEacc(N2A)+NOISE(2A, 3A)+NOISEmin=0+1+0=1. The sum of noise for the input link (2B, 3A) is computed as follows (step S1011): NOISEacc(N2B)+NOISE(2B, 3A)+NOISEmin=2+2+0=4.

The sum of noise for the input link (1A, 3A) is computed as follows (step S1011): NOISEacc(N1A)+NOISE(1A, 3A)+NOISEmin=0+4+0=4. The sum is not more than NOISEth(=7) and thus the input links (2A, 3A), (2B, 3A), and (1A, 3A) are not deleted (step S1013).

The sum of the cost for the input link (2A, 3A) is computed as follows: COSTacc(N2A)+COST(2A, 3A)=2+2=4. The sum of cost for the input link (2B, 3A) is computed as follows: COSTacc(N2B)+COST(2B, 3A)=1+4=5. The sum of cost for the input link (1A, 3A) is computed as follows: COSTacc(N1A)+COST(1A, 3A)=0+10=10. As a result, the input link (2A, 3A) that yields the lowest sum of cost is selected as an input link L to the node 3A (step S1016).

Cumulative cost COSTacc(N3A) up to the node 3A is computed as follows (step S1017): COSTacc(N2A)+COST(2A, 3A)=2+2=4. Since the node 3A is a node corresponding to an OADM (step S1018:YES), cumulative noise NOISEacc(N3A) up to the node 3A is equal to 0 (zero) (step S1019).

Determination of an input link L to the node 3B is explained. Since the node 3B is a node corresponding to an ILA (step S1003: NO), a path from the node 3B to 4A is searched for as a minimum noise path (step S1006). The minimum value of noise NOISEmin becomes 2 (step S1007). As input links to the node 3B, the input links (2A, 3B), (2B, 3B) and (1A, 3B) are acquired (step S1009).

The sum of noise for the input link (2A, 3B) is computed as follows (step S1011): NOISEacc(N2A)+NOISE(2A, 3B)+NOISEmin=0+2+2=4. The sum of noise for the input link (2B, 3B) is computed as follows (step S1011): NOISEacc(N2B)+NOISE(2B, 3B)+NOISEmin=2+3+2=7.

The sum of noise for the input link (1A, 3B) is computed as follows (step S1011): NOISEacc(N1A)+NOISE(1A, 3B)+NOISEmin=0+5+2=7. Since the sums are not more than NOISEth(=7) (step S1011: YES), the input links (2A, 3B), (2B, 3B) and (1A, 3B) are not deleted (step S1013).

The sum of cost for the input link (2A, 3B) is computed as follows: COSTacc(N2A)+COST(2A, 3B)=2+2=4. The sum of cost for the input link (2B, 3B) is computed as follows: COSTacc(N2B)+COST(2B, 3B)=1+2=3. The sum of cost for the input link (1A, 3B) is computed as follows: COSTacc(N1A)+COST(1A, 3B)=0+10=10. As a result, the input link (2B, 3B) that yields the lowest sum of cost is selected as an input link L to the node 3B (step S1016).

Cumulative cost COSTacc(N3B) up to the node 3B is computed as follows (step s1017): COSTacc(N2B)+COST(2B, 3B)=1+2=3. Since the node 3B is a node corresponding to an ILA (step S1018: NO), cumulative noise NOISEacc(N3B) up to the node 3B is computed as follows (step S1021): NOISEacc(N2B)+NOISE(2B, 3B)=2+3=5.

Determination of an input link L to the node 4A is explained. Since the node 4A is a node corresponding to an OADM (step S1003: YES), the minimum value of noise NOISEmin becomes 0 (zero) (step S1004). As input links to the node 4A, the input links (3A, 4A), (3B, 4A) and (1A, 4A) are acquired (step S1009).

The sum of noise for the input link (3A, 4A) is computed as follows (step S1011): NOISEacc(N3A)+NOISE(3A, 4A)+NOISEmin=0+1+0=1. The sum of noise for the input link (3B, 4A) is computed as follows (step S1011): NOISEacc(N3B)+NOISE(3B, 4A)+NOISEmin=5+2+0=7.

The sum of noise for the input link (1A, 4A) is computed as follows (step S1011): NOISEacc(N1A)+NOISE(1A, 4A)+NOISEmin=0+5+0=5. The sums are not more than NOISEth (=7) (step S1011: YES) and thus the input links (3A, 4A), (3B, 4A) and (1A, 4A) are not deleted (step S1013).

The sum of cost for the input link (3A, 4A) is computed as follows: COSTacc(N3A)+COST(3A, 4A)=4+2=6. The sum of cost for the input link (3B, 4A) is computed as follows: COSTacc(N3B)+COST(3B, 4A)=3+2=5. The sum of cost for the input link (1A, 4A) is computed as follows: COSTacc(N1A)+COST(1A, 4A)=0+10=10. As a result, the input link (3B, 4A) that yields the lowest sum of cost is selected as an input link L to the node 4A (step S1016).

Cumulative cost COSTacc(N4A) up to the node 4A is computed as follows (step S1017): COSTacc(N3B)+COST(3B, 4A)=3+2=5. Since the node 4A is a node corresponding to an OADM (step S1018: YES), cumulative noise NOISEacc(N4A) up to the node 4A becomes 0 (zero) (step S1019).

Determination of an input link L to the node 4B is explained. Since the node 4B is a node corresponding to an ILA (step S1003: NO), a path from the node 4B to 6A is searched for as a minimum noise path up to a downstream optical regeneration node of the node 4B (step S1006). The minimum value of noise is equal to 3+2=5 (step S1007). As input links to the node 4B, the input links (3A, 4B), (3B, 4B), (1A, 4B) and (2A, 4B) are acquired (step S1009).

The sum of noise for the input link (3A, 4B) is computed as follows (step S1011): NOISEacc(N3A)+NOISE(3A, 4B)+NOISEmin=0+2+5=7. The sum of noise for the input link (3B, 4B) is computed as follows (step S1011): NOISEacc(N3B)+NOISE(3B, 4B)+NOISEmin=5+3+5=13. The sum of noise for the input link (1A, 4B) is computed as follows (step S1011): NOISEacc(N1A)+NOISE(1A, 4B)+NOISEmin=0+6+5=11.

The sum of noise for the input link (2A, 4B) is computed as follows (step S1011): NOISEacc(N2A)+NOISE(2A, 4B)+NOISEmin=0+2+5=7. Some of the sums are more than NOISEth(=7) and thus the input links (3B, 4B) and (1A, 4B) are deleted (step S1013).

The sum of cost for the input link (3A, 4B) is computed as follows (step S1016): COSTacc(N3A)+COST(3A, 4B)=4+1=5. The sum of cost for the input link (2A, 4B) is computed as follows: COSTacc(N2A)+COST(2A, 4B)=2+2=4. As a result, the input link (2A, 4B) that yields the lowest sum of cost is selected as an input link L to the node 4B (step S1016).

Cumulative cost COSTacc(N4B) up to the node 4B is computed as follows (step S1017): COSTacc(N2A)+COST(2A, 4B)=2+2=4. Since the node 4B is a node corresponding to an ILA (step S1018: NO), cumulative noise NOISEacc(N4B) up to the node 4B is computed as follows (step S1021): NOISEacc(N2A)+NOISE(2A, 4B)=0+2=2.

Determination of an input link L to the node 5B is explained. Since the node 5B is a node corresponding to an ILA (step S1003: NO), a path from the node 5B to 6A is searched for as a minimum noise path up to a downstream optical regeneration node of the node 5B (step S1006). The minimum value of noise NOISEmin becomes 2 (step S1007). As input links to the node 5B, the input links (4A, 5B) and (4B, 5B) are acquired (step S1009).

The sum of noise when the input link (4A, 5B) is selected is computed as follows (step S1011): NOISEacc(N4A)+NOISE(4A, 5B)+NOISEmin=0+2+2=4. The sum of noise when the input link (4B, 5B) is selected is computed as follows: NOISEacc(N4B)+NOISE(4B, 5B)+NOISEmin=2+3+2=7. These sums are not more than NOISEth(=7) (step S1011: YES), and thus the input links (4A, 5B) and (4B, 5B) are not deleted (step S1013).

The sum of cost for the input link (4A, 5B) is computed as follows (step S1016): COSTacc(N4A)+COST(4A, 5B)=5+2=7. The sum of cost for the input link (4B, 5B) is computed as follows: COSTacc(N4B)+COST(4B, 5B)=4+2=6. As a result, the input link (4B, 5B) that yields the lowest sum of cost is selected as an input link L to the node 5B (step S1016).

Cumulative cost COSTacc(N5B) up to the node 5B is computed as follows (step S1017): COSTacc(N4B)+COST(4B, 5B)=4+2=6. Since the node 5B is a node corresponding to an ILA (step S1018: NO), cumulative noise NOISEacc(N5B) up to the node 5B is computed as follows (step S1021): NOISEacc(N4B)+NOISE(4B, 5B)=2+3=5.

Determination of an input link L to the node 6A is explained. Since the node 6A is a node corresponding to an OADM (step S1003: YES), the minimum value of noise NOISEmin becomes 0 (zero) (step S1004). As input links to the node 6A, only the input link (5B, 6A) is acquired (step S1009).

The sum of noise for the input link (5B, 6A) is computed as follows (step S1011): NOISEacc(N5B)+NOISE(5B, 6A)+NOISEmin=5+2+0=7. The sum of noise for the input link (5B, 6A) is not more than NOISEth(=7) (step S1011: YES) and thus the input link (5B, 6A) is not deleted (step S1013).

The sum of cost for the input link (5B, 6A) is computed as follows (step S1016): COSTacc(N5B)+COST(5B, 6A)=6+3=9. The only remaining input link is the input link (5B, 6A) and thus the input link (5B, 6A) is selected as an input link L to the node 6A (step S1016).

Cumulative cost COSTacc(N6A) up to the node 6A is computed as follows (step S1017): COSTacc(N5B)+COST(5B, 6A)=6+3=9. Since the node 6A is a node corresponding to an OADM (step S1018: YES), cumulative noise NOISEacc(N6A) up to the node 6A becomes 0 (zero) (step S1019).

Determination of an input link L to the node 6B is explained. Since the node 6B is a node corresponding to an ILA (step S1003: NO), a path up to the node 7A is searched for (step S1006) and the minimum value of noise NOISEmin becomes 2 (step S1007). As input links to the node 6B, only the input link (5B, 6B) is acquired (step S1009).

The sum of noise for the input link (5B, 6B) is computed as follows (step S1011): NOISEacc(N5B)+NOISE(5B, 6B)+

NOISEmin=5+3+2=10. This sum is more than NOISEth(=7) (step S1011: NO) and thus the input link (5B, 6B) is deleted (step S1013).

For the node 6B, the input links acquired at step S1009 are deleted. Therefore, processes after step S1016 are not performed for the node 6B. In addition, the input links (6B, 7A) and (6B, 7B) for which the node 6B is the starting node are deleted.

Determination of an input link L to the node 7A is explained. The node 7A is a node corresponding to an OADM (step S1003: YES) and thus the minimum value of noise NOISEmin becomes 0 (zero) (step S1004). As input links to the node 7A, only the input link (6A, 7A) is acquired (step S1009).

The sum of noise for the input link (6A, 7A) is computed as follows (step S1011): NOISEacc(N6A)+NOISE(6A, 7A)+NOISEmin=0+1+0=1. The sum is not more than NOISEth (=7) (step S1011: YES) and thus the input link (6A, 7A) is not deleted (step S1013).

The sum of cost for the input link (6A, 7A) is computed as follows (step S1016): COSTacc(N6A)+COST(6A, 7A)=9+2=11. Since the only remaining input link is the input link (6A, 7A), the input link (6A, 7A) is selected as an input link L to the node 7A (step S1016).

Cumulative cost COSTacc(N7A) up to the node 7A is computed as follows (step S1017): COSTacc(N6A)+COST (6A, 7A)=9+2=11. Since the node 7A is a node corresponding to an OADM (step S1018: YES), cumulative noise NOISEacc(N7A) up to the node 7A becomes 0 (zero) (step S1019).

Determination of an input link L to the node 7B is explained. Since the node 7B is a node corresponding to an ILA (step S1003: NO), a path from the node 7B to 8A is searched for as a minimum noise path up to a node which is downstream from the node 7B and can be provided with an optical regenerative repeater (step S1006) and the minimum value of noise NOISEmin becomes 2 (step S1007). As input links to the node 7B, only the input link (6A, 7B) is acquired (step S1009).

The sum of noise for the input link (6A, 7B) is computed as follows (step S1011): NOISEacc(N6A)+NOISE(6A, 7B)+NOISEmin=0+2+2=4. This sum is not more than NOISEth (=7) (step S1011: YES) and thus the input link (6A, 7B) is not deleted (step S1013).

The sum of cost for the input link (6A, 7B) is computed as follows (step S1016): COSTacc(N6A)+COST(6A, 7B)=9+1=10. Since the only remaining input link is the input link (6A, 7B), the input link (6A, 7B) is selected as an input link L to the node 7B (step S1016).

Cumulative cost COSTacc(N7B) is computed as follows (step S1017): COSTacc(N6A)+COST(6A, 7B)=9+1=10. Since the node 7B is a node corresponding to an ILA (step S1018: NO), cumulative noise NOISEacc(N7B) up to the node 7B is computed as follows (step S1021): NOISEacc (N6A)+NOISE(6A, 7B)=0+2=2.

Determination of an input link L to the node 8A is explained. Since the node 8A is a node corresponding to an OADM applicable as an optical regenerative repeater (step S1003: YES), the minimum value of noise NOISEmin becomes 0 (zero) (step S1004). As input links to the node 8A, the input links (7A, 8A) and (7B, 8A) are acquired (step S1009).

The sum of noise for the input link (7A, 8A) is computed as follows (step S1011): NOISEacc(N7A)+NOISE(7A, 8A)+NOISEmin=0+1+0=1. The sum of noise for the input link (7B, 8A) is computed as follows (step S1011): NOISEacc (N7B)+NOISE(7B, 8A)+NOISEmin=2+2+0=4. These sums are not more than NOISEth(=7) (step S1011: YES) and thus the input links (7A, 8A) and (7B, 8A) are not deleted (step S1013).

The sum of cost for the input link (7A, 8A) is computed as follows (step S1016): COSTacc(N7A)+COST(7A, 8A)=11+2=13. The sum of cost for the input link (7B, 8A) is computed as follows (step S1016): COSTacc(N7B)+COST(7B, 8A)=10+2=12. As a result, the input link (7B, 8A) that has the least cost is selected as an input link L to the node 8A (step S1016).

Cumulative cost COSTacc(N8A) up to the node 8A is computed as follows (step S1017): COSTacc(N7B)+COST (7B, 8A)=10+2=12. Since the node 8A is a node corresponding to an OADM (step S1018: YES), cumulative noise NOISEacc(N8A) up to the node 8A becomes 0 (zero) (step S1019). In this way, an input link L to each node is chosen.

Figure 12:
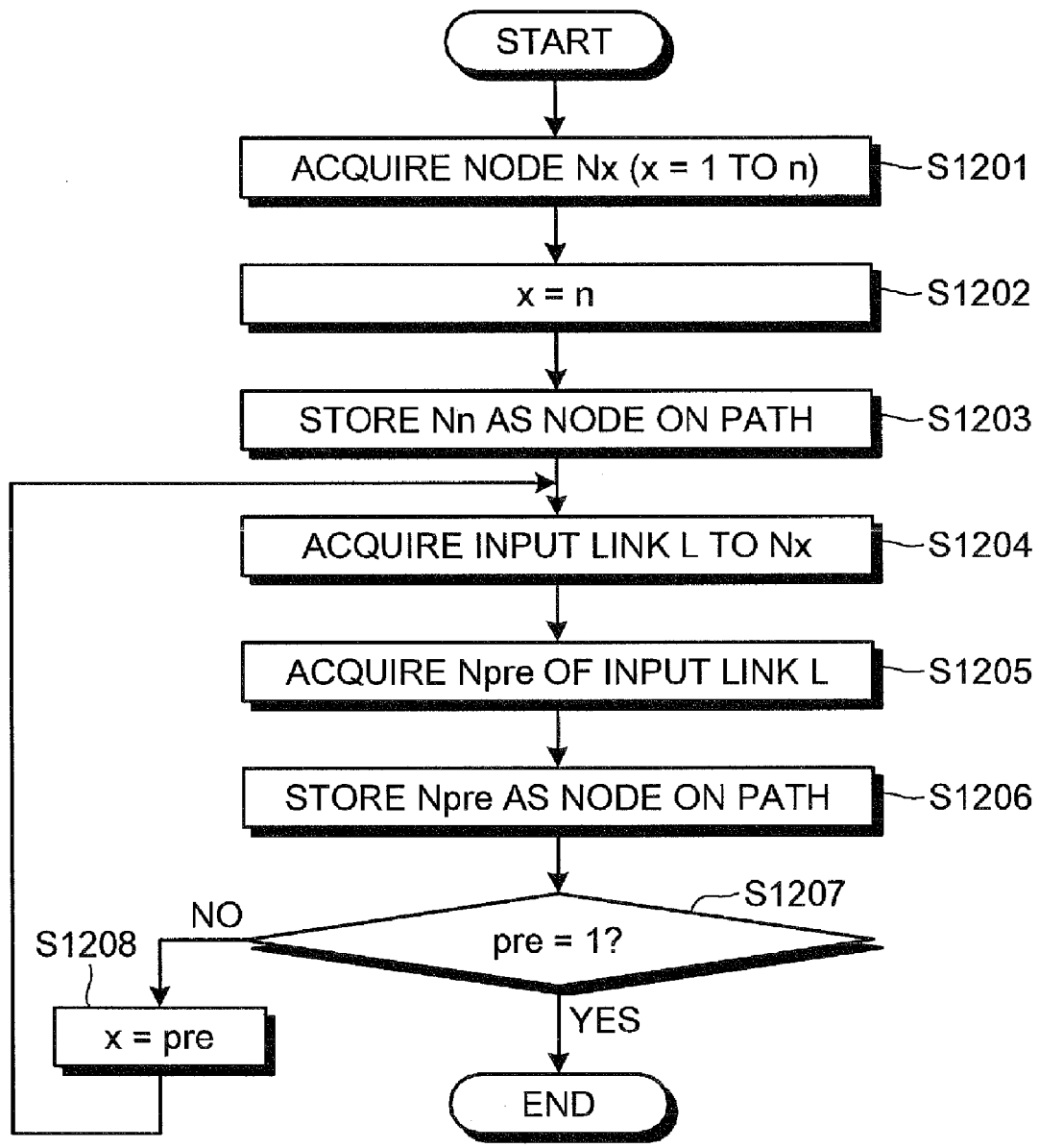
FIG. 12 is a flowchart of one example of a node-on-path determination by a determining unit.

FIG. 12 is a flowchart of one example of a node-on-path determination by the determining unit. As depicted in FIG. 12, node Nx (x=1 to n) generated by the node generation unit 131 is acquired (step S1201). The node number x of the node Nx acquired at step S1201 is set to n (step S1202). The node number n denotes the number for an optical transmission device provided at the terminal station of a liner section of the design subject.

A node Nn is stored as a node on a path (step S1203). From among input links L selected at step S1016 of FIG. 10B, an input link L to the node Nx is acquired (step S1204). A starting node Npre of the input link L acquired at step S1204 is acquired (step S1205).

The starting node Npre is stored as a node on a path (step S1206). It is determined whether the number pre of the node Npre acquired at step S1205 is equal to 1 (step S1207). The number 1 denotes the number for an optical transmission device provided at the starting station of a linear section of the design subject.

If the number pre of Npre is not equal to 1 (step S1207: NO), the number x of the node Nx is replaced with the number pre of the node Npre (step S1208) and the flow returns to step S1204. If the number pre of Npre is equal to 1 (step S1207: YES), the entire process is terminated.

At each step above, the nodes on a path stored at steps S1203 and S1206 are used as information concerning optical transmission devices for stations within a linear section of the design subject. An example is explained hereinafter where the steps depicted in FIG. 12 are applied to examples depicted in FIGS. 7 to 9 and 11.

Figure 13:
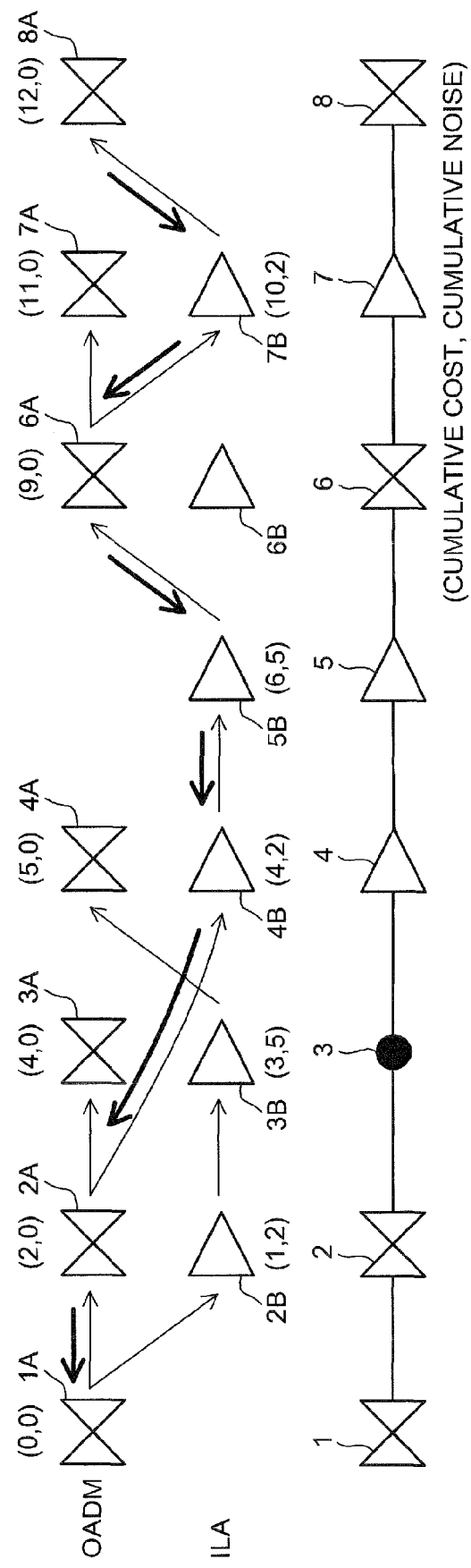
FIG. 13 is a diagram of a result of the node-on-path determination depicted in FIG. 12.

FIG. 13 is a diagram of a result of the node-on-path determination depicted in FIG. 12. In FIG. 13, parts identical to those depicted in FIGS. 7 to 9 and 11 are given identical reference signs, respectively and the explanation thereof is omitted. In FIG. 13, bold arrows denote a path of nodes acquired at the steps depicted in FIG. 12. Below the graph, the type of optical transmission device determined at each step is shown. Symbol ● denotes a bypass.

The number of the node 8A is set (step S1202) and the node 8A is stored as one of the nodes on a path (step S1203). As an input link L to the node 8A, the input link (7B, 8A) is acquired (step S1204). As a starting node Npre of the link (7B, 8A), the node 7B is acquired (step S1205) and the node 7B is stored as one of the nodes on a path (step S1206).

The number of the node 7B is set (step S1202). As an input link to the node 7B, the input link (6A, 7B) is acquired (step S1204). As a starting node Npre of the input link (6A, 7B), the node 6A is acquired (step S1205) and the node 6A is stored as one of the nodes on a path (step S1206).

The number of the node 6A is set (step S1202). As an input link to the node 6A, the input link (5B, 6A,) is acquired (step S1204). As a starting node Npre of the input link (6B, 6A), the node 5B is acquired (step S1205) and the node 5B is stored as one of the nodes on a path (step S1206).

The number of the node 5B is set (step S1202). As an input link to the node 5B, the input link (4B, 5B) is acquired (step S1204). As a starting node Npre of the input link (4B, 5B), the node 4B is acquired (step S1205) and the node 4B is stored as one of the nodes on a path (step S1206).

The number of the node 4B is set (step S1202). As an input link to the node 4B, the input link (2A, 4B) is acquired (step S1204). As a starting node Npre of the input link (2A, 4B), the node 2A is acquired (step S1205) and the node 2A is stored as one of the nodes on a path (step S1206).

The number of the node 2A is set (step S1202). As an input link to the node 2A, the input link (1A, 2A) is acquired (step S1204). As a starting node Npre of the input link (1A, 2A), the node 1A is acquired (step S1205) and the node 1A is stored as one of the nodes on a path (step S1206).

Since the number of the node 1A is the number of a node for an optical transmission device placed at station 1, the starting station at the linear section 201 (step S1207: YES), the node-on-path determination is terminated. In this way, the input links L are followed from the node 8A to the node 1A so that nodes on a path are stored in order of nodes 8A→7B→6A→5B→4B→2A→1A.

The output unit 150 outputs the nodes on a path in a reverse order (nodes 1A, 2A, 4B, 5B, 6A, 7B, 8A) as arrangement information of optical transmission device for stations 1 to 8. A user provides, based on the node 1A, an OADM in station 1 and further provides, based on the node 2A, an OADM in station 2.

Since a node does not exist for the station 3, the user places a bypass in the station 3. An ILA is provided in the station 4 based on the node 4B. An ILA is provided in the station 5 based on the node 5B. An OADM is provided in the station 6 based on the node 6A. An ILA is provided in the station 7 based on the node 7B.

Figure 14:
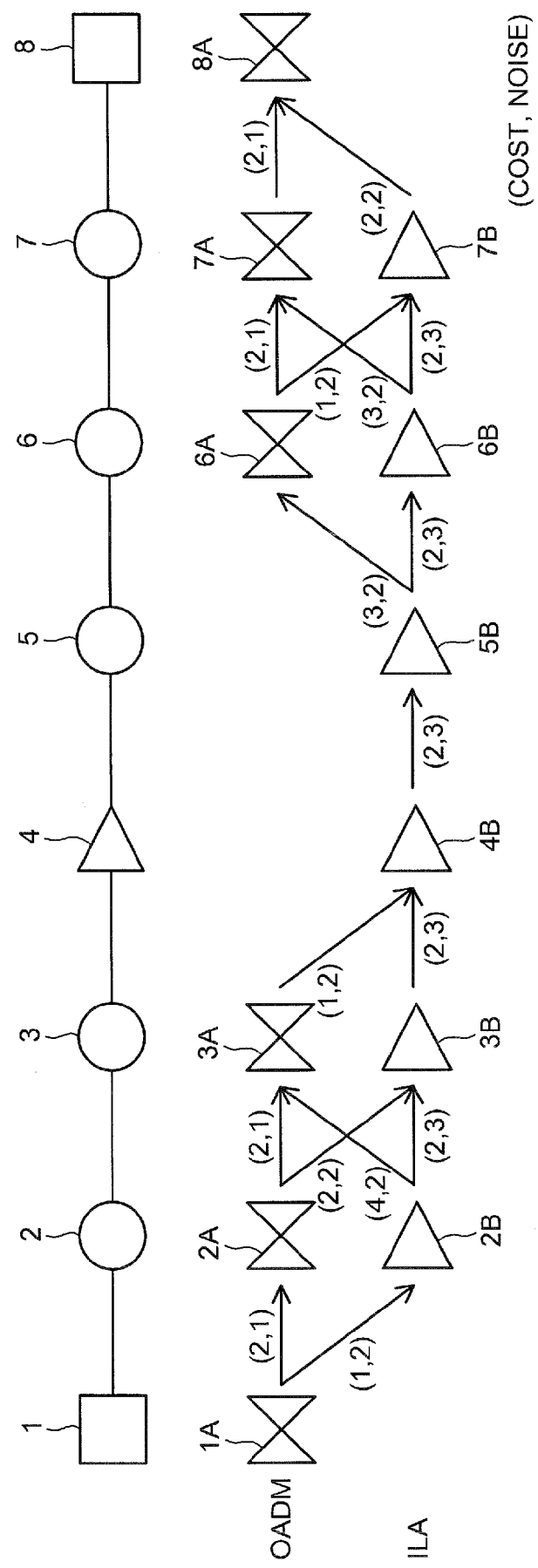
FIG. 14 is a diagram of another example of the graphical information generated by the graph generation unit.

FIG. 14 is a diagram of another example of the graphical information generated by the graph generation unit. When the information output from the acquisition unit 110 includes information indicating that only ILAs can be provided in the stations 4 and 5, the node generation unit 131 does not generate nodes corresponding to the nodes 4A and 5A. In this case, processing by units downstream from the node generation unit 131 is the same as explained above, the explanation thereof is omitted.

FIG. 15 is a flowchart of one example of network design depicted in FIG. 2. When stations are designed in the network 200 depicted in FIG. 2, a path of traffic is selected as indicated in FIG. 15 (step S1501). The path of traffic is a path that transfers a WDM optical signal among the nodes depicted in FIG. 2.

A WDM transmission device is provided based on the path selected at step S1501 (step S1502). The WDM transmission device provided at step S1502 is the optical transmission device explained in the above exemplary embodiments such as OADM, ILA, or bypass. With respect to the WDM transmission devices selected at step S1502, dispersion compensation devices are provided based on the path selected at step S1501 (step S1503)

For traffic that requires an optical regenerative repeater on the path, an optical regenerative repeater is provided to a WDM transmission device, provided at the step S1502, which can include the optical regenerative repeater (step s1504) and network design is terminated. The network design apparatus 100 of the exemplary embodiments can be used for step S1502.

As explained above, according to the exemplary embodiments, optical transmission devices are arranged so that transmission degradation does not exceed a threshold, thereby ensuring the signal is transmittable. Among arrangements for which transmission degradation is equal to or below a threshold, that which further has the least cost is designed, thereby enabling a cost-controlled arrangement to be designed swiftly.

In other words, based on the information acquired by the acquisition unit 110, graphical information, nodes corresponding to various types of optical transmission devices to be provided in stations, and links connecting the nodes and appended with cost and transmission degradation values are generated. From the graphical information, a path is searched for where transmission degradation does not exceed a threshold and for which cost is the lowest, thereby facilitating the design of an arrangement of optical transmission devices having transmission degradation that is equal to or below a threshold and for which cost is the lowest.

As explained above, according to the embodiments, an arrangement can swiftly be designed so that transmission degradation is suppressed within an optically re-generable range and cost such as that concerning equipment or the transmission degradation is optimized.

In the explanation above, cost has been defined as cost including equipment cost of optical transmission devices provided in stations and transmission degradation of optical signals between stations including the optical transmission devices. However, cost is not limited to such cost. For example, cost may be equipment cost of optical transmission devices provided in stations. In this case, an arrangement of optical transmission devices can swiftly be designed so that transmission degradation is suppressed within an optically re-generable range and the equipment cost is optimized.

When a WDM device that can be provided in a station is only a bypass, a node is not generated in a graph according to the explanation above. However, by having the acquisition unit 110 preliminarily hide information concerning such a station, the above exemplary embodiments can be applied.

The method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A network design apparatus for designing an arrangement of optical transmission devices in stations in a linear section of a network, comprising:
   a computer processor comprising:
   an acquiring unit that acquires information concerning a type of optical transmission device applicable in the stations, respectively, and information concerning cost and transmission degradation associated with arrangement of the optical transmission devices;
   a designing unit that, based on the information acquired by the acquiring unit, designs an arrangement of the optical transmission devices wherein the cost is lowest, the cost being lowest among arrangements wherein between stations in which optical transmission devices applicable as optical regenerative repeaters are provided, the transmission degradation is less than or equal to a threshold; and an outputting unit that outputs information concerning the arrangement designed by the designing unit, the designing unit comprising:
a graph generating unit that generates graphical information, nodes that correspond to the optical transmission devices applicable in the stations, respectively, and links that connect the nodes and to which the transmission degradation and the cost are correlated, respectively, and
a searching unit that searches the graphical information for a path corresponding to the arrangement for which the transmission degradation is less than or equal to the threshold and the cost is the least, and the graph generating unit comprises:
a node generating unit that generates one or more nodes for each of the stations, the nodes corresponding to the optical transmission devices applicable in the stations, respectively, at least two of the generated nodes corresponding to a same one of the stations,
a link generating unit that generates one or more input links to each of the nodes, wherein an input link to a given node among the nodes is from a node of a station upstream from a station of the given node, and
a computing unit that computes the transmission degradation and the cost for each of the input links generated by the link generating unit.

2. The network design apparatus according to claim 1, wherein the searching unit comprises:
a selecting unit that, from among the input links generated by the link generating unit, selects input links that, up to an arbitrary node, yield a cumulative cost that is lowest; and
a determining unit that determines the optical transmission devices to be arranged in the stations respectively, based on starting nodes of the input links selected by the selecting unit.

3. The network design apparatus according to claim 2, wherein the selecting unit selects from among the input links generated by the link generating unit and yielding a cumulative transmission degradation that is less than or equal to a threshold, input links for which the cumulative cost is lowest, the cumulative transmission degradation being cumulative up to a subsequent node corresponding to an optical transmission device applicable as an optical regenerative repeater in a station downstream from a given node.

4. The network design apparatus according to claim 3, wherein the selecting unit uses, as the cumulative transmission degradation, a sum of: cumulative transmission degradation up to a starting node of a given input link, the transmission degradation for the given input link, and a lowest transmission degradation from the given node to the subsequent node.

5. The network design apparatus according to claim 4, wherein the selecting unit sets to zero, the cumulative transmission degradation up to the given node when the given node corresponds to an optical transmission device applicable as an optical regenerative repeater.

6. The network design apparatus according to claim 4, wherein the selecting unit sets to zero the lowest transmission degradation when the given node corresponds to an optical transmission device applicable as an optical regenerative repeater.

7. The network design apparatus according to claim 1, wherein the acquiring unit acquires, as the information concerning the transmission degradation, information concerning noise that occurs in optical signals transmitted between the stations and is associated with the optical transmission devices in the stations.

8. The network design apparatus according to claim 1, wherein the acquiring unit acquires, as the information concerning the transmission degradation, information concerning transmission penalty that occurs in optical signals transmitted between the stations and is associated with the optical transmission devices in the stations.

9. The network design apparatus according to claim 1, wherein the acquiring unit designs an arrangement where each type of transmission degradation between the stations is less than or equal to a threshold, respectively.

10. The network design apparatus according to claim 1, wherein the optical transmission device applicable as an optical regenerative repeater is an optical add/drop device.

11. The network design apparatus according to claim 1, wherein the linear section includes three or more stations connected linearly where a starting station and a terminal station include optical transmission devices applicable as optical regenerative repeaters, and stations excluding the starting station and the terminal station include an optical transmission device applicable as an optical regenerative repeater or an optical transmission device that is not applicable as an optical regenerative repeater.

12. The network design apparatus according to claim 1, wherein the cost includes: equipment cost for the optical transmission devices and the transmission degradation between the stations when the optical transmission devices are provided in the stations.

13. A network design method for designing an arrangement of optical transmission devices in stations in a linear section of a network, comprising:
acquiring, by a computer, information concerning a type of optical transmission device applicable in the stations, respectively, and information concerning cost and transmission degradation associated with arrangement of the optical transmission devices;
designing, by the computer, based on the information acquired at the acquiring, an arrangement of the optical transmission devices wherein the cost is lowest, the cost being lowest among arrangements wherein, between stations in which optical transmission devices applicable as optical regenerative repeaters are provided, the transmission degradation is less than or equal to a threshold; and
outputting information concerning the arrangement designed at the designing, said designing comprising:
generating, by the computer, graphical information, nodes that correspond to the optical transmission devices applicable in the stations, respectively, at least two of the generated nodes corresponding to a same one of the stations, and links that connect the nodes and to which the transmission degradation and the cost are correlated, respectively, and searching, by the computer, the graphical information for a path corresponding to the arrangement for which the transmission degradation is less than or equal to the threshold and the cost is the least, and said generating comprises:

generating, by the computer, one or more nodes for each of the stations, the nodes corresponding to the optical transmission devices applicable in the stations, respectively, generating, by the computer, one or more input links to each of the nodes, wherein an input link to a given node among the nodes is from a node of a station upstream from a station of the given node, and computing, by the computer, the transmission degradation and the cost for each of the input links generated by said generating one or more input links.

14. A non-transitory computer-readable recording medium storing therein a network design program for designing an arrangement of optical transmission devices in stations in a linear section of a network and causing thea computer to execute:

acquiring information concerning a type of optical transmission device applicable in the stations, respectively, and information concerning cost and transmission degradation associated with arrangement of the optical transmission devices;

designing, based on the information acquired at the acquiring, an arrangement of the optical transmission devices wherein the cost is lowest, the cost being lowest among arrangements wherein, between stations in which optical transmission devices applicable as optical regenerative repeaters are provided, the transmission degradation is less than or equal to a threshold; and outputting information concerning the arrangement designed in said designing, said designing comprising:

generating graphical information, nodes that correspond to the optical transmission devices applicable in the stations, at least two of the generated nodes corresponding to a same one of the stations, respectively, and links that connect the nodes and to which the transmission degradation and the cost are correlated, respectively, and searching the graphical information for a path corresponding to the arrangement for which the transmission degradation is less than or equal to the threshold and the cost is the least, and said generating comprises:

generating one or more nodes for each of the stations, the nodes corresponding to the optical transmission devices applicable in the stations, respectively, generating one or more input links to each of the nodes, wherein an input link to a given node among the nodes is from a node of a station upstream from a station of the given node, and computing the transmission degradation and the cost for each of the input links generated by said generating one or more input links.

* * * * *

UNITED STATES PATENT AND TRADEMARK OFFICE
CERTIFICATE OF CORRECTION

PATENT NO. : 8,078,701 B2  
APPLICATION NO. : 12/235166  
DATED : December 13, 2011  
INVENTOR(S) : Tomohiro Hashiguchi et al.

Page 1 of 1

It is certified that error appears in the above-identified patent and that said Letters Patent is hereby corrected as shown below:

Column 23, Line 16, In Claim 14, delete "thea" and insert -- a --, therefor.

Signed and Sealed this
Twenty-first Day of February, 2012

David J. Kappos
*Director of the United States Patent and Trademark Office*